United States Patent
Levy et al.

(10) Patent No.: US 11,914,518 B1
(45) Date of Patent: Feb. 27, 2024

(54) APPARATUS AND METHOD FOR OPERATING A CACHE STORAGE

(71) Applicant: Arm Limited, Cambridge (GB)

(72) Inventors: Yoav Asher Levy, Kfar Saba (IL); Elad Kadosh, Herzeliya (IL); Jakob Axel Fries, Lund (SE); Lior-Levi Bandal, Kfar Saba (IL)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/949,607

(22) Filed: Sep. 21, 2022

(51) Int. Cl.
*G06F 12/0884* (2016.01)

(52) U.S. Cl.
CPC .. *G06F 12/0884* (2013.01); *G06F 2212/1021* (2013.01)

(58) Field of Classification Search
CPC .. G06F 12/0884; G06F 12/12; G06F 12/0864; G06F 12/0844; G06F 12/0871; G06F 12/123; G06F 12/121; G06F 2212/1016; G06F 2212/1024; G06F 2212/604
See application file for complete search history.

(56) References Cited

U.S. PATENT DOCUMENTS

| | | | | |
|---|---|---|---|---|
| 5,559,986 A | * | 9/1996 | Alpert | G06F 12/0851 |
| | | | | 711/E12.047 |
| 2002/0188806 A1 | * | 12/2002 | Rakvic | G06F 12/0864 |
| | | | | 711/119 |
| 2004/0103250 A1 | * | 5/2004 | Alsup | G06F 12/1045 |
| | | | | 711/E12.047 |
| 2004/0143708 A1 | * | 7/2004 | Caprioli | G06F 12/125 |
| | | | | 711/E12.074 |
| 2005/0052449 A1 | * | 3/2005 | Emberling | G06F 12/0859 |
| | | | | 711/E12.051 |
| 2011/0055485 A1 | * | 3/2011 | Eddy | G06F 12/128 |
| | | | | 711/E12.001 |

(Continued)

OTHER PUBLICATIONS

Abadi, F.K.H. and Safari, S., Oct. 2014. Performance and area aware replacement policy for GPU architecture. In 2014 4th International Conference on Computer and Knowledge Engineering (ICCKE) (pp. 497-503). IEEE.*

(Continued)

*Primary Examiner* — Tracy A Warren
(74) *Attorney, Agent, or Firm* — NIXON & VANDERHYE P.C.

(57) ABSTRACT

A cache is provided having a plurality of entries for storing data. In response to a given access request, lookup circuitry performs a lookup operation in the cache to determine whether one of the entries in the cache is allocated to store data associated with the memory address indicated by the given access request, with a hit indication or a miss indication being generated dependent on the outcome of that lookup operation. During a single lookup period, the lookup circuitry is configured to perform lookup operations in parallel for up to N access requests. In addition, allocation circuitry is provided that is able to determine, during the single lookup period, at least N candidate entries for allocation from amongst the plurality of entries, and to cause one of the candidate entries to be allocated for each of the up to N access requests for which the lookup circuitry generates a miss indication.

18 Claims, 14 Drawing Sheets

(56) References Cited

U.S. PATENT DOCUMENTS

| | | | | |
|---|---|---|---|---|
| 2014/0032845 | A1* | 1/2014 | Avudaiyappan | G06F 12/0897 |
| | | | | 711/E12.024 |
| 2014/0156947 | A1* | 6/2014 | Avudaiyappan | G06F 12/0895 |
| | | | | 711/138 |
| 2016/0027204 | A1* | 1/2016 | Lee | G06T 15/06 |
| | | | | 345/426 |
| 2017/0091096 | A1* | 3/2017 | Mccarthy | G06F 12/128 |
| 2020/0050550 | A1* | 2/2020 | Muthler | G06T 15/06 |
| 2022/0101483 | A1* | 3/2022 | Riguer | G06T 17/10 |
| 2022/0114108 | A1* | 4/2022 | Koker | G06F 12/126 |
| 2023/0102891 | A1* | 3/2023 | Moyer | G06F 12/123 |
| | | | | 711/118 |

OTHER PUBLICATIONS

Advanced Caching Techniques, CSE P548, Autumn 2006, pp. 1-11.

Andreas Abel, "Automatic Generation of Models of Microarchitectures", Dissertation, Jun. 12, 2020, 198 pages.

Gille et al, "Study of Different Cache Line Replacement Algorithms in Embedded Systems", Master Thesis, ARM France SAS, https://people.kth.se/~ingo/MasterThesis/ThesisDamienGille2007.pdf, Mar. 8, 2007, 104 pages.

McGuire, GitHub "Pseudo-LRU implementation using 1-bit per entry and achieving Full-LRU performance" retrieved Sep. 14, 2022, https://github.com/karlmcguire/plru, pp. 1-4.

Lecture-18 (Cache Optimizations), CS422-Spring 2018, biswa@CSE-IITK, pp. 1-11.

Meister et al., "A Survey on Bounding Volume Hierarchies for Ray Tracing", Eurographics 2021, vol. 40(2021), No. 2, STAR-State of the Art Report, Jun. 4, 2021, 30 pages.

Hussein Al-Zoubi, et al. "Performance Evaluation of Cache Replacement Policies for the SPEC CPU2000 Benchmark Suite", ACMSE'04, Apr. 2-3, 2004, pp. 267-272.

Tree-PLRU based L1 Eviction Timer, https://leaky.page/plru.html, 1 page.

Lee et al. "A Novel Mobile GPU Architecture based on Ray Tracing", 2013 IEEE International Conference on Consumer Electronics (ICCE), Jan. 11-14, 2013, pp. 21-22.

* cited by examiner

APPARATUS AND METHOD FOR OPERATING A CACHE STORAGE

BACKGROUND

The present technique relates to an apparatus and method for operating a cache storage.

Caches are used in a wide variety of data processing systems to seek to improve speed of access to data by one or more processing elements having access to those caches. Some processing tasks performed by processing elements are highly data intensive, and it is desirable to provide caches that can service the various requests for data issued by such processing elements in a timely manner. In particular, the time taken to obtain requested data from a cache may in some instances limit the throughput achievable by a processing element accessing data from the cache, and hence in order to improve throughput it would be desirable in such situations to improve the rate at which requests for data can be processed by such a cache.

By way of specific example, caches may be used in graphic processing units (GPUs), and many of the tasks performed by the processing elements in GPUs are highly data intensive. For instance, ray tracing may require the performance of many calculations in parallel, and the volume of data required to be processed by the ray tracing unit may place significant demands on a cache used by a GPU to store data for access by the ray tracing unit. In such an implementation it would be desirable to provide a cache whose ability to process requests for data does not impact the potential throughput achievable by the ray tracing unit.

It will be appreciated that the ray tracing unit is mentioned above purely by way of an example of a processing element that performs tasks that are highly data intensive, and the techniques described herein can be used in a wide variety of cache implementations to improve the throughput of handling of data access requests received by the cache.

SUMMARY

In one example arrangement, there is provided an apparatus comprising: a cache storage comprising a plurality of entries to store data; lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request; wherein the lookup circuitry is configured to perform, during a single lookup period, lookup operations in parallel for up to N access requests, where N is a plural integer; and the apparatus further comprises: allocation circuitry configured to determine, during the single lookup period, at least N candidate entries for allocation from amongst the plurality of entries, and to cause one of the candidate entries to be allocated for each of the up to N access requests for which the lookup circuitry generates the miss indication.

In another example arrangement, there is provided a method of operating a cache storage comprising a plurality of entries to store data, the method comprising: employing lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request; arranging the lookup circuitry to perform, during a single lookup period, lookup operations in parallel for up to N access requests, where N is a plural integer; and arranging allocation circuitry to determine, during the single lookup period, at least N candidate entries for allocation from amongst the plurality of entries; and causing one of the candidate entries to be allocated for each of the up to N access requests for which the lookup circuitry generates the miss indication.

In a still further example arrangement, there is provided a computer-readable medium to store computer-readable code for fabrication of an apparatus comprising: a cache storage comprising a plurality of entries to store data; lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request; wherein the lookup circuitry is configured to perform, during a single lookup period, lookup operations in parallel for up to N access requests, where N is a plural integer; and the apparatus further comprises: allocation circuitry configured to determine, during the single lookup period, at least N candidate entries for allocation from amongst the plurality of entries, and to cause one of the candidate entries to be allocated for each of the up to N access requests for which the lookup circuitry generates the miss indication. Such computer-readable code can be disposed in any known transitory computer-readable medium (such as wired or wireless transmission of code over a network) or non-transitory computer-readable medium such as semiconductor, magnetic disk, or optical disc.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
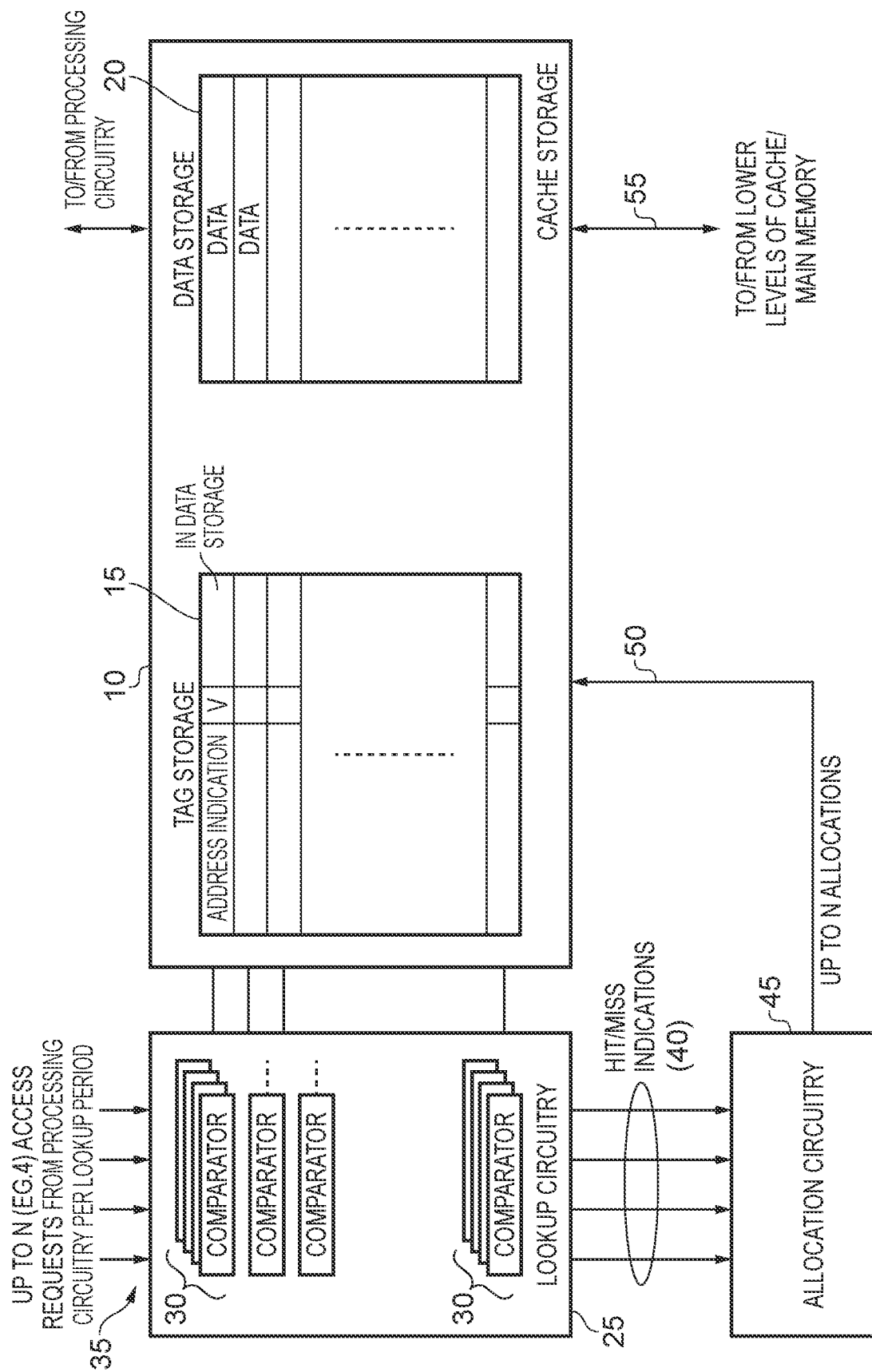
FIG. 1 is a block diagram schematically illustrating an apparatus in accordance with one example implementation.

In accordance with example implementations described herein, an apparatus is provided that has a cache storage comprising a plurality of entries to store data. Also provided is lookup circuitry which, in response to a given access request, is arranged to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request.

In order to improve performance, the lookup circuitry is configured to perform, during a single lookup period, lookup operations in parallel for up to N access requests, where N is a plural integer. The time associated with the single lookup period may vary dependent on implementation but in one example implementation is a single clock cycle, and accordingly lookup operations can be performed for up to N access requests in a single clock cycle.

For each lookup operation that results in a miss indication, it is necessary to allocate an entry within the cache that can be used to hold the data that will be retrieved into the cache (from a lower level cache or main memory) as a result of downstream processing of the access request following the miss. In order to ensure that throughput can be maintained, the apparatus further comprises allocation circuitry configured to determine, during the single lookup period, at least N candidate entries for allocation from amongst the plurality of entries, and to cause one of the candidate entries to be allocated for each of the up to N access requests for which the lookup circuitry generates the miss indication. Hence, during each lookup period (which as mentioned earlier may in one example implementation be a single clock cycle), not only can lookup operations be performed in parallel for up to N access requests, but in addition the allocation circuitry is able to determine enough candidate entries from amongst which entries can be allocated for each of those lookup operations that results in a miss indication (which could be up to N if each of the lookup operations results in a miss). By enabling the allocation circuitry to perform up to N allocations each lookup period, this enables the throughput benefits achievable through the ability to perform N lookup operations in parallel to be maintained even in the presence of cache misses.

It is to be noted that when an entry is allocated for a cache miss, it may be some time before the actual data required is retrieved from a lower level of cache or main memory. However, in one example implementation, the entry can include a flag to identify whether the data is still awaited, or whether it is already stored within the entry, and once the entry has been allocated any subsequent access request indicating the same memory address (and hence relating to the same data) can be arranged to result in a hit indication, irrespective of whether the data is yet present in the hit entry or not (if it is not available yet, it can be forwarded on in due course once that data is received by the cache). This avoids generating multiple miss indications for the same data if multiple access requests for that data are issued over multiple lookup periods.

There are a number of ways in which the allocation circuitry can be arranged to determine the at least N candidate entries. In one example implementation the apparatus further comprises vector providing circuitry to provide an input vector specifying a qualifying value for each of the plurality of entries in the cache, and the allocation circuitry is then arranged to determine the at least N candidate entries in dependence on the input vector.

There are various types of input vector that could be generated. For example, a PLRU (pseudo least recently used) scheme such as a PLRUm scheme (a variant of a NRU (not recently used) scheme) could be used to generate an input vector comprising a bit for each entry, where the value of each bit provides the qualifying value for the associated entry. The input vector generated by such a scheme will be dependent on previous access activity to the cache, with the aim of seeking to bias selection of a victim entry (to be used as an allocated entry) towards an entry whose current contents have been less recently used than the contents of other entries. In an alternative implementation, a random replacement scheme could be used, and again an input vector could be generated of a similar form to the input vector mentioned above for the PLRUm scheme (such a PLRUm scheme also sometimes being referred to as a bit PLRU scheme), but where the value attributed to each bit is generated randomly or pseudo-randomly. Typically, such schemes are only used to identify a single victim entry, but in accordance with the techniques described herein the allocation circuitry can be arranged to re-purpose such input vectors in order to enable multiple victim entries to be determined in a single lookup period.

In some example implementations the input vector could be provided "as is" to the allocation circuitry, but in accordance with one example implementation the apparatus further comprises input vector modification circuitry to selectively modify the input vector prior to provision to the allocation circuitry, to take account of at least one modification condition. The modification condition could take a variety of forms. For example, it may be desirable to exclude one or more entries from being selected as candidate entries for allocation, for example because it is understood that those entries store data which it is anticipated would be beneficial to retain within the cache. In one example implementation, a mask vector could for example be used to identify such entries, such that the mask vector could then be logically combined with the input vector to create a modified input vector for providing to the allocation circuitry.

As another example of a potential modification, and considering the earlier-discussed PLRUm scheme, there may be a storage structure that stores the current input vector, and the input vector as maintained within that storage structure may be updated to reflect the results of each lookup operation. However, it may be beneficial in a current lookup period, from a performance perspective, to make use of a current form of the input vector stored in the storage before there has been an opportunity to update that input vector within the storage based on the result of the lookup operations performed in the current lookup period. In such cases, any hits detected during the current lookup period could be used, in much the same way as the earlier-discussed mask vector (for example by forming a hit vector identifying any entries for which a hit has been detected), to alter the current input vector prior to provision to the allocation circuitry.

The form of the qualifying values provided within the input vector may vary dependent on implementation. However, in one example implementation, each qualifying value is set to either a first value or a second value. For example, the first value may be a logic 0 value and the second value may be a logic 1 value, but it will be appreciated that the meaning attributed to logic 0 and logic 1 values within the input vector could be reversed if desired, such that the first value would in that case be a logic 1 value and the second value would be a logic 0 value.

In one example implementation, at least when a number K of qualifying values having the first value in the input vector as provided to the allocation circuitry is at least equal to a number P of miss indications generated by the lookup circuitry in the lookup period, where P is less than or equal to N, the allocation circuitry is inhibited from selecting as one of the at least N candidate entries any entry whose associated qualifying value has the second value. Hence, the entries required to be allocated for each of the P miss indications can be selected from amongst those entries whose qualifying values have the first value in the input vector as provided to the allocation circuitry.

It should be noted that in the above scenario the at least N candidate entries are selected from amongst those entries whose qualifying value has the first value in the version of the input vector as provided to the allocation circuitry. As mentioned earlier, the input vector may in some instances be modified prior to provision to the allocation circuitry, for example to take into account a hit vector or a mask vector as discussed earlier, and that modification may involve transitioning the qualifying value for one or more entries from the first value to the second value. In such cases the at least N candidate entries will be chosen from those entries whose associated qualifying value in the modified input vector have the first value.

In one example implementation, the vector providing circuitry comprises pseudo least recently used (PLRU) vector providing circuitry to maintain, as the input vector, a PLRU vector specifying, as the qualifying value for each of the plurality of entries, a usage indication value for each of the plurality of entries. The usage indication value may for example be set to the second value when the associated entry is allocated and when a hit indication is detected for the associated entry, and may be reset to the first value upon detection of a reset condition. The reset condition can be arranged to occur in a variety of ways dependent on implementation. However, in one example implementation the reset condition occurs when the last remaining usage indication value that had the first value is transitioned to the second value, and this can be arranged to cause all of the other usage indication values to be cleared to the first value at that point.

As an alternative to an implementation involving the generation of a PLRU vector, a random replacement scheme could be used, with the vector providing circuitry then generating an input vector of a similar form to the PLRU vector mentioned above, but where the value attributed to each bit is generated randomly or pseudo-randomly.

As mentioned earlier, when the number K of qualifying values having the first value in the input vector as provided to the allocation circuitry is at least equal to the number P of miss indications generated during the lookup period, the allocation circuitry can be arranged to select the required candidate entries from amongst those whose associated qualifying value has the first value. If instead the number K of qualifying values having the first value was less than the number P of miss indications, one approach could be to select the K candidate entries whose qualifying values have the first value, then invert the input vector so that all qualifying values that had the second value now have the first value and all the qualifying values that previously had the first value have the second value, and then continue making the required number of additional candidate entry selections based on the modified (inverted) vector. However, this could have a significant timing impact on the operation, since it would be necessary first to consume all of the entries whose associated qualifying values have the first value in the original vector, and then create an inverted vector from which the remaining entries can be determined.

However, in accordance with one example implementation, this timing impact is alleviated. In particular, in one example implementation, when the number K of qualifying values having the first value in the input vector as provided to the allocation circuitry is less than the number P of miss indications generated by the lookup circuitry in the lookup period, the allocation circuitry is arranged to determine at least K candidate entries whose associated qualifying values have the first value, for allocation for K access requests for which the lookup circuitry has generated the miss indication, and to determine at least P-K candidate entries whose associated qualifying values have the second value, for allocation for P-K access requests for which the lookup circuitry has generated the miss indication. Hence, the allocation circuitry can be arranged to generate the required number of candidate entries without needing to perform the time-intensive process discussed earlier, that would require performing a first level of analysis using the input vector, then inverting the input vector, and then performing a further level of analysis, in order to determine the required number of candidate entries.

In one example implementation, the above operation of the allocation circuitry is achieved by providing the allocation circuitry with the input vector and an inverted version of the input vector. Then, the allocation circuitry is arranged to determine the P-K candidate entries whose associated qualifying values have the second value by determining P-K candidate entries whose associated qualifying values have the first value in the inverted version of the input vector. By such an approach, this can enable the same circuit components to be used to form the portion of the allocation circuitry that determines the at least K candidate entries whose associated qualifying values have the first value in the input vector, and the portion of the allocation circuitry that determines the at least P-K candidate entries whose associated qualifying values have the second value in the input vector.

In one example implementation, the allocation circuitry comprises first determination circuitry to determine a first N candidate entries whose associated qualifying values have the first value and second determination circuitry to determine a second N candidate entries whose associated qualifying values have the second value. When the number K of qualifying values having the first value in the input vector as provided to the allocation circuitry is at least equal to the number P of miss indications generated by the lookup circuitry in the lookup period, the allocation circuitry can be arranged to cause the candidate entries allocated for each access request for which the lookup circuitry has generated the miss indication to be selected from the first N candidate entries. In contrast, when the number of qualifying values K having the first value in the input vector as provided to the allocation circuitry is less than the number of miss indications P generated by the lookup circuitry in the lookup period, the allocation circuitry can be arranged to cause the candidate entries allocated for K access requests for which the lookup circuitry has generated the miss indication to be selected from the first N candidate entries, and to cause the candidate entries allocated for P-K access requests for which the lookup circuitry has generated the miss indication to be selected from the second N candidate entries. Such an approach can provide a very fast mechanism for determining the candidate entries to be allocated for each of the up to N access requests for which the lookup circuitry generates the miss condition, and hence can be very useful in implementations where the lookup period is short.

In one such implementation, the allocation circuitry may be provided with the input vector and an inverted version of the input vector. This would then enable the second determination circuitry to be constructed identically to the first determination circuitry. The first determination circuitry can then be provided with the input vector, whilst the second determination circuitry is provided with the inverted version of the input vector. In such an implementation, the second determination circuitry may be arranged to determine the second N candidate entries whose associated qualifying values have the second value by determining a second N candidate entries whose associated qualifying values have the first value in the inverted version of the input vector. This hence provides a particular efficient implementation, enabling the same determination circuitry design to be used for both the first determination circuitry and the second determination circuitry.

In some example implementations the allocation circuitry may be arranged to comprise first direction analysis circuitry and second direction analysis circuitry operating in parallel. The first direction analysis circuitry may be configured to analyse the input vector as provided to the allocation circuitry, starting from a first end, in order to identify at least N/2 candidate entries, and the second direction analysis circuitry may be configured to analyse the input vector as provided to the allocation circuitry, starting from a second end, in order to identify at least N/2 candidate entries. This provides a particularly quick mechanism for identifying N candidate entries within the input vector.

In one example implementation that employs the above-mentioned first direction analysis circuitry and second direction analysis circuitry, each qualifying value may take the form of a single bit. The allocation circuitry may then be provided with the input vector and a bit order reversed version of the input vector, and the second direction analysis circuitry may be constructed identically to the first direction analysis circuitry. In such an implementation, the first direction analysis circuitry may be provided with the input vector, and the second direction analysis circuitry may be provided with the bit order reversed version of the input vector. The second direction analysis circuitry can then be arranged to identify the at least N/2 candidate entries starting from the second end of the input vector by identifying at least N/2 candidate entries starting from the first end of the bit order reversed version of the input vector. This hence provides a particularly efficient implementation, enabling the same analysis circuitry design to be reused to implement both the first direction analysis circuitry and the second direction analysis circuitry In one example implementation that employs both the first determination circuitry and the second determination circuitry discussed earlier, both the first determination circuitry and the second determination circuitry may comprise the first direction analysis circuitry and the second direction analysis circuitry operating in parallel. In accordance with one such implementation, the second determination circuitry may then be provided with the inverted version of the input vector and a bit order reversed version of the inverted input vector.

The allocation circuitry can be constructed in a variety of ways. In one example implementation, the allocation circuitry comprises a plurality of determination blocks forming at least one group of determination blocks, where each group comprises multiple determination blocks arranged in series. A first determination block in each group is arranged to receive a source vector derived from the input vector, and each other determination block in any given group is arranged to receive as a source vector an updated vector generated by a preceding determination block in that given group. This allows for a very modular design where the same basic circuit building blocks (the individual determination blocks) can be used multiple times, and hence enables a very efficient implementation. The way in which the source vector is derived from the input vector may vary dependent on the group of determination blocks in question. By way of example, the source vector received by the first determination block in any given group of determination blocks could be the input vector, an inverted version of the input vector, a bit order reversed version of the input vector or a bit order reversed version of the inverted input vector.

The determination blocks can take a variety of forms, but in one example implementation each determination block comprises combining circuitry to logically combine an incremented version of its source vector and an inverted version of its source vector to generate a one hot vector indicating a candidate entry. The form of the combining circuitry will vary dependent on implementation, and in particular the meanings associated with logic 1 and logic 0 values in the source vector. However, in one example implementation, the combining circuitry takes the form of AND gate circuitry. By such an approach, the one hot vector can for example be arranged to indicate the location of the first logic zero value starting from the first end of the received source vector.

Further, in one example implementation, each determination block that is used to generate an updated vector to be used as a source vector for a next determination block is arranged to generate the updated vector by performing a logical OR computation using its source vector and an incremented version of its source vector. This can provide a particularly fast implementation for generating the required updated vector, as the updated vector can be produced without needing to await the output of the above-mentioned combining circuitry.

In one particular example implementation that employs both the earlier mentioned first and second determination circuits, and where both determination circuits comprise first and second direction analysis circuits, each instance of the first direction analysis circuitry and the second direction analysis circuitry may be formed by a group of determination blocks. A first determination block in the first direction analysis circuitry of the first determination circuitry may be arranged to receive as its source vector the input vector, whilst a first determination block in the second direction analysis circuitry of the first determination circuitry may be arranged to receive as its source vector a bit order reversed version of the input vector. Similarly, a first determination block in the first direction analysis circuitry of the second determination circuitry may be arranged to receive as its source vector an inverted version of the input vector, whilst a first determination block in the second direction analysis circuitry of the second determination circuitry may be arranged to receive as its source vector a bit order reversed version of the inverted version of the input vector.

In such an implementation, the number of determination blocks within each group of determination blocks may vary dependent on implementation. However, in one particular example implementation, each group of determination block comprises two determination blocks. This can provide a particularly fast implementation that can be used within systems where the lookup period is very short.

As an alternative to the above described techniques where the allocation circuitry is responsive to an input vector, the allocation circuitry could alternatively be arranged in a different manner. For example, in one implementation, the allocation circuitry is arranged to employ a tree pseudo least recently used (tree-PLRU) scheme to determine N candidate entries. The lookup circuitry is arranged to generate, during each lookup period, a result signal indicating each entry for which a hit indication has been generated in that lookup period. The result signal can take a variety of forms, but in one example implementation takes the form of a hit vector providing a value associated with each entry, with the value being set to a specific value (e.g. a logic 1 value) for each entry for which the hit indication has been generated. Further, the allocation circuitry is arranged to maintain N separate tree structures, and to update each tree structure based on each result signal generated by the lookup circuitry. These updates can for example be performed in parallel, such that each tree structure is updated in parallel once per lookup period, based on the result signal generated during that lookup period.

Hence, each of the tree structures is populated based on the same information. However, control circuitry is provided to phase each of the tree structures relative to each other so that at any point in time each of them will identify a different candidate entry. In particular, each separate tree structure is associated with one of N possible misses observable in any given lookup period, and the allocation circuitry comprises the above-mentioned control circuitry to control each separate tree structure such that, when triggered by the control logic, that separate tree structure is arranged to identify the candidate entry for the associated miss. The control logic is further arranged, in a given lookup period, to cause each of the separate tree structures to be updated in dependence on a number of misses observed in that given lookup period.

By maintaining N separate tree structures in parallel, it has been found possible to meet the timing requirements necessary to provide allocation circuitry that can determine candidate entries for up to N miss indications detected during a single lookup period. Each separate tree structure is effectively a replica of each other tree structure, in that it is populated based on the same hit information occurring as a result of the lookups performed within the cache. However, the control circuitry phases each tree structure relative to each other tree structure so that the tree structures point to the entries to be used as allocated entries for different misses detected within the same lookup period, and hence collectively can be used to identify the allocated entry to be used for the first miss, the allocated entry to be used for the second miss, all the way through to the allocated entry to be used for the N-th miss, respectively.

In any given lookup period, the control circuitry will only activate the required number of tree structures to provide the necessary number of allocated entries, and thereafter each of the tree structures will need to be updated based on the number of misses for which an allocated entry has been determined. Purely by way of example, if N is 4, and in a given lookup period two misses are detected, the first tree structure will be triggered to identify the allocated entry for the first miss, and the second tree structure will be triggered to identify the allocated entry for the second miss, but the third and fourth tree structures will not be triggered since no further allocated entries need to be identified. However, at the end of this process, all four of the tree structures will be updated to take account of the fact that two allocated entries have been identified, hence keeping each tree structure one phase ahead of the preceding tree structure in the group of tree structures.

The lookup period may be varied dependent on implementation, but in one it particular example implementation the lookup period comprises one clock cycle. Hence, in this scenario, the described apparatus can be used not only to perform lookup operations in parallel for up to N access requests during a single clock cycle, but also to allocate entries in the cache for all of the up to N miss indications that might be generated during that single clock cycle due to the processing of the N access requests.

The cache storage can take a variety of forms but in one example implementation the cache storage is a fully associative cache storage, and hence each entry needs to be reviewed in respect of each received access request. It has been found that in many data intensive applications, better throughput can be achieved when using a fully associative cache.

The value of N may vary dependent on implementation, but in one particular example implementation N is 4. Hence, in that implementation up to 4 access requests can be processed in a single clock cycle, and up to 4 entries can be allocated in that single clock cycle if necessary (i.e. if all of those access requests result in a miss indication being generated).

The lookup circuitry can be arranged in a variety of ways, but in one example implementation comprises multiple instances of comparison circuitry operating in parallel to allow the memory addresses specified by each of the up to N access requests to be compared against an address indication for each entry.

Particular configurations of the present techniques will now be described with reference to the accompanying figures.

FIG. 1 is a block diagram of an apparatus in accordance with one example implementation. A cache 10 is provided that has a data storage 20 comprising a plurality of entries for storing data. To identify the data held in each entry of the data storage, a TAG storage 15 is provided that has a tag entry for each data entry in the data storage 20. As schematically shown in FIG. 1, each tag entry provides an address indication for the data stored in the associated data entry, that is used to indicate the memory address associated with that data. Additional information may also be provided within the tag entry, such as a valid flag used to indicate whether the contents of the associated data entry are valid, and any other required control information, such as a field to indicate whether the data associated with the address indication held in the tag entry has yet been retrieved into the corresponding data entry of the data storage 20 or not. In particular, in the illustrated example implementation an entry in the cache can be allocated for the storage of data before that data has been retrieved from memory, and hence the tag entry of the allocated entry may be arranged to store an address indication for that data and have the valid field set, before the data has actually been retrieved into the data storage. Hence it is useful to provide an additional field in the tag storage entry to identify whether the associated data has yet been received into the corresponding data storage entry or not.

In association with the cache storage 10, lookup circuitry 25 is provided to process access requests 35 received from processing circuitry. In particular, each such access request is arranged to identify the memory address of the data being requested, and the lookup circuitry is used to determine whether data associated with that memory address is currently cached within the cache storage or not. As shown in FIG. 1, the lookup circuitry may comprise a plurality of comparators 30 for comparing address indications provided in received access requests with the address indications stored in each tag entry of the tag storage that is currently marked as valid. In the example shown in FIG. 1, the lookup circuitry is able to process multiple access requests 35 in parallel, for example four access requests in parallel as shown in the specific example of FIG. 1. Also, in the example of FIG. 1 it is assumed that the cache storage is arranged as a fully associative cache, and hence data for any given memory address can be stored in any of the entries of the cache storage. Thus, as shown in FIG. 1, multiple comparator circuits 30 may be provided in association with each entry of the cache storage, to enable the required comparison operations to be performed for each of the multiple access requests that may be received in parallel, for each of the entries of the cache storage.

As a result of the lookup operations performed, hit or miss indications 40 will be output from the lookup circuitry for each of the multiple access requests processed in parallel. Taking by way of example an implementation where four access requests can be processed in parallel, it can be seen that four indications will be produced by the lookup circuitry to identify up to four hits, or indeed up to four misses, per lookup period. In one example implementation the lookup period is a single clock cycle, and hence up to four access requests can be processed in a single clock cycle, with hit or miss indications produced for each of the access requests.

When a hit indication is produced for a particular access request, then the data may be retrieved from that hit entry and returned to the processing circuitry. However, in the event of a miss indication for a particular access request, then the access request will need to be propagated on to a lower level of cache and/or main memory in order to access the required data, with that data then being routed back via the cache storage to the requesting processing circuitry. At the time a miss indication is detected, then in accordance with one example implementation an entry will be allocated within the cache storage to receive the data retrieved from memory. Once an entry has been allocated, then whilst that entry remains allocated within the cache any subsequent access request providing a matching memory address will result in a hit indication, hence significantly increasing the speed with which the associated data can be provided to the requesting processing circuitry.

However, in order to ensure that the cache can continue to process multiple access requests per lookup period, it is necessary to ensure that the required number of cache entries can be allocated per lookup period for every detected miss. It will be appreciated from the above discussion that in the worst case a miss indication may be generated for every access request processed during a particular lookup period, and in that case it will be necessary to determine entries within the cache storage to be used as the allocated entries to store the data associated with each of those miss indications. As shown in FIG. 1, allocation circuitry 45 is provided that receives each of the hit/miss indications 40 output by the lookup circuitry, and which, in a single lookup period, is able to determine up to N entries within the cache to be used as the allocated entries for the data associated with each miss indication, where N is equal to the maximum number of access requests that can be processed in a single lookup period, and hence in the example of FIG. 1 N is 4. Various schemes have been developed to seek to identify victim entries whose current contents are to be invalidated (sometimes in association with the eviction of that content to a lower level of cache or main memory) in order to free up that victim entry to be an allocated entry to receive the data associated with an access request that has resulted in a miss indication being generated, but typically such schemes only seek to identify a single victim entry per lookup period. However, as will be discussed in more detail below, various arrangements of allocation circuitry are described herein which are able to identify up to N entries for allocation each lookup period.

As shown in FIG. 1, an identification of each of the entries to be allocated entries may be signalled over path 50 to the cache storage 10, to cause the cache to invalidate the current contents of each identified entry and to then populate those allocated entries with the required information associated with each miss indication. Hence, an address indication identifying the memory address of the access request that missed will be stored within the relevant tag entry, the valid field will be set to indicate that the entry is valid, and in one example implementation the "in data storage" field will be marked to identify that the data is not yet in the corresponding data entry. However, once that data has been received by the cache storage 10 as a result of the processing of the access request by one or more lower levels of cache or main memory, that data can be stored in the associated data entry, at which point the "in data storage" field will be marked to identify that the data is now in the corresponding data entry. In one example implementation, the lookup circuitry is arranged, when processing a subsequent access request, to generate a hit indication on determining that one of the entries has an address indication that matches the address indication provided by that access request, irrespective of whether the associated data is yet in the cache or not, with the data then being returned in response to the access request when it is available.

The above described approach allows the cache to operate as a non-blocking cache, which is able to process up to N access requests per lookup period (as mentioned earlier in one example implementation the lookup period is a single clock cycle), and to allocate up to N candidate entries for each miss indication generated as a result of processing the access requests in any given lookup period.

Such a high throughput cache can be useful in a variety of situations where a processing element making use of the cache consumes data at a high rate. Purely by way of example, the cache described with reference to FIG. 1 may be used within a graphics processing unit (GPU), for reference by processing elements within the GPU. As an example of a very data intensive task performed by the GPU, the GPU may be arranged to perform ray tracing, this being a technique that helps to make graphics (such as those used in games) more realistic, as it aims to better emulate the way that light reflects and interacts in the real world, thus making the graphics more immersive. However, ray tracing techniques typically require the performance of many calculations in parallel, and the volume of data required to be processed by the ray tracing unit of a GPU may place significant demands on a cache used by a GPU to store data for access by the ray tracing unit. The cache designs described herein may be used in association with a ray tracing unit with the aim of maintaining a high enough throughput to meet the requirements of the ray tracing unit.

Figure 2:
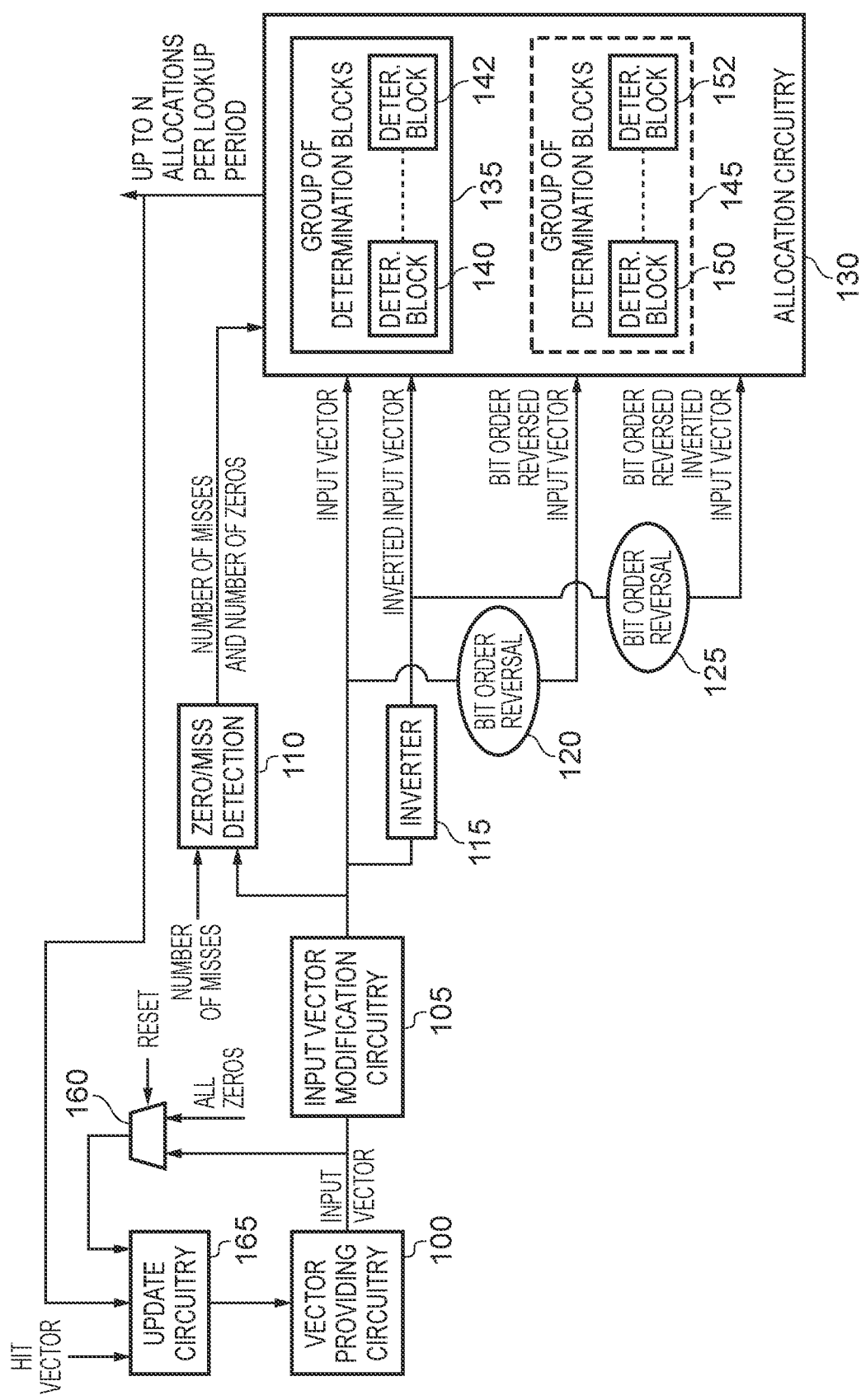
FIG. 2 is a diagram illustrating in more detail the allocation circuitry and associated components, in accordance with one example implementation.

FIG. 2 is a block diagram illustrating in more detail components provided in association with the allocation circuitry in accordance with one example implementation. Vector providing circuitry 100 is used to generate an input vector that specifies a qualifying value for each of the plurality of entries within the cache, with the value of that qualifying value dictating whether any given entry can be used as a candidate entry for allocation. The form of the input vector may vary dependent on implementation. For example, a PLRUm scheme (a variant of a NRU (not recently used) scheme) could be used to generate an input vector comprising a bit for each entry, where the value of each bit provides the qualifying value for the associated entry. The input vector generated by such a scheme will be dependent on previous access activity to the cache, with the aim of seeking to bias selection of a victim entry (to be used as an allocated entry) towards an entry whose current contents have been less recently used than the contents of other entries. In an alternative implementation, a random replacement scheme could be used, and again an input vector could be generated of a similar form to the input vector mentioned above for the PLRUm scheme, but where the value attributed to each bit is generated randomly or pseudo-randomly.

The input vector may be used "as is" to inform the decisions made by the allocation circuitry, but alternatively may first be processed by input vector modification circuitry 105, which may in certain circumstances alter the input vector prior to its provision to the allocation circuitry. For example, the input vector modification circuitry may be provided with a mask vector that can be used to identify one or more entries whose contents should be retained within the cache, and that mask vector may be used to adjust the input vector as needed so that the input vector as provided to the allocation circuitry provides a qualifying value for each of those "to be retained" entries that will prevent such entries being chosen as candidate entries for allocation. As another example, considering the earlier-discussed PLRUm scheme, the vector providing circuitry may take the form of a storage element that stores the current input vector, and the input vector as maintained within that storage may be updated to reflect the results of each lookup operation. However, it may be beneficial from a performance perspective to make use of a current form of the input vector stored in the storage before there has been an opportunity to update that input vector within the storage based on the result of the lookup operations performed in a current iteration of the lookup period. In such cases, any hits detected during the current lookup period could be used by the input vector modification circuitry 105, in much the same way as the earlier-discussed mask vector (for example by forming a hit vector identifying any entries for which a hit has been detected), to alter the current input vector prior to provision to the allocation circuitry.

In the example shown in FIG. 2, the input vector as output by the input vector modification circuitry 105 is provided to the allocation circuitry 130 and, depending on implementation, one or more other versions of the input vector may also be provided to the allocation circuitry. In particular, inverter circuitry 115 may be arranged to invert the input vector so as to provide an inverted input vector to the allocation circuitry. Also, as shown in FIG. 2, the wiring between the input vector modification circuitry 105 and the allocation circuitry 130 may be arranged to perform a bit order reversal function 120, 125 to create bit order reversed versions of the input vector and the inverted input vector, if desired, with those bit order reversed versions then also being provided to the allocation circuitry.

As schematically shown in FIG. 2, the allocation circuitry 130 may be formed of one or more groups 135, 145 of determination blocks, where each group of determination blocks comprises multiple determination blocks 140, 142, or 150, 152, arranged in series. A first determination block in each group may be arranged to receive a source vector that is derived from the input vector, and each other determination block in any given group may be arranged to receive as a source vector an updated vector generated by a preceding determination block in the given group. Different source vectors may be provided for different determination groups, and as will be apparent from the example implementations discussed in detail later, the source vector for any given group could be the input vector, the inverted input vector, the bit order reversed input vector or the bit order reversed inverted input vector. The number of groups of determination blocks will also vary dependent on implementation, and in the examples discussed hereafter the number of groups may be one, two or four, depending on the implementation.

Each of the groups of determination blocks 135, 145 can be used to determine a number of candidate entries, and a selection can then be made from amongst those determined candidate entries in order to determine the up to N allocations required per lookup period. In order to determine which generated candidate entry (and hence which group of determination blocks) is used to form each allocated entry, the allocation circuitry is provided with an indication of the number of misses detected in the current lookup period, which will determine how many allocated entries need to be identified by the allocation circuitry. In addition, the allocation circuitry will also be provided with an indication of the number of qualifying values having a particular value within the input vector as provided to the allocation circuitry. In one particular example, the qualifying value can be either 0 or 1, and by default the allocation circuitry will seek to determine the required number of allocation entries from amongst those entries whose associated qualifying value is 0.

It will be appreciated that if the number of entries having an indicated qualifying value of 0 in the provided input vector exceeds the number of misses for which an entry needs to be allocated, then the allocation circuitry can merely select the entries to be allocated from amongst those entries whose qualifying value is 0. However, if the number of misses exceeds the number of entries having an indicated qualifying value of 0, then additional steps will need to be taken to identify the required number of allocation entries. In accordance with the techniques described herein, the various groups of determination blocks are used to generate a variety of candidate entries, and then the allocation circuitry determines which of those candidate entries to use as allocated entries dependent on the number of misses detected in the current clock cycle, and the number of logic 0 values in the provided input vector. As shown in FIG. 2, zero/miss detection circuitry 110 is used to receive an indication of the number of misses detected in the current cycle, to evaluate from the input vector the number of logic zero values, and to provide that information to the allocation circuitry.

In implementations where the vector providing circuitry 100 takes the form of storage maintaining a current input vector, as for example would be the case if the earlier described PLRUm scheme is used, then during each clock cycle the stored input vector within the vector providing circuitry 100 will be updated. This is achieved in FIG. 2 using the update circuitry 165, which in one example implementation can take the form of a logical OR gate to create the updated input vector based on a combination of the inputs provided to the update circuitry 165. As shown, a hit vector can be provided to the update circuitry identifying each entry for which a hit has been detected in the current cycle. In particular, a vector can be generated where a logic one value is indicated for each entry that has resulted in a hit. A similar vector (which will be referred to herein as an allocation vector) can be generated based on the allocations made by the allocation circuitry, and in particular each allocated entry can be indicated by a logic one value in that vector. These two inputs to the update circuitry can then be logically combined with the current input vector routed via the multiplexer 160 to the input of the update circuitry, in order to generate the updated input vector to be stored within the vector providing circuitry 100.

In response to a reset condition, the multiplexer 160 can be arranged to select an all zeros value to output to the update circuitry, for then logically combining with the hit vector and the allocation vector. In one example implementation, the reset condition will occur if the zero/miss detection circuitry 110 detects that the number of misses in the current cycle is greater than or equal to the number of logic zero values in the input vector, since at that point it will be known that all of the existing logic zero values in the input vector will be used to identify an allocation entry, and for each such identified allocation entry the corresponding qualifying value in the input vector should be changed from 0 to 1. However, once the last remaining 0 value in the input vector is changed to 1 (which will be the case in the above scenario), then all other entries in the input vector should be reset to 0. By using the above reset technique to generate an all zeros input to the update circuitry under detection of the above condition, this behaviour can be maintained.

Figure 3:
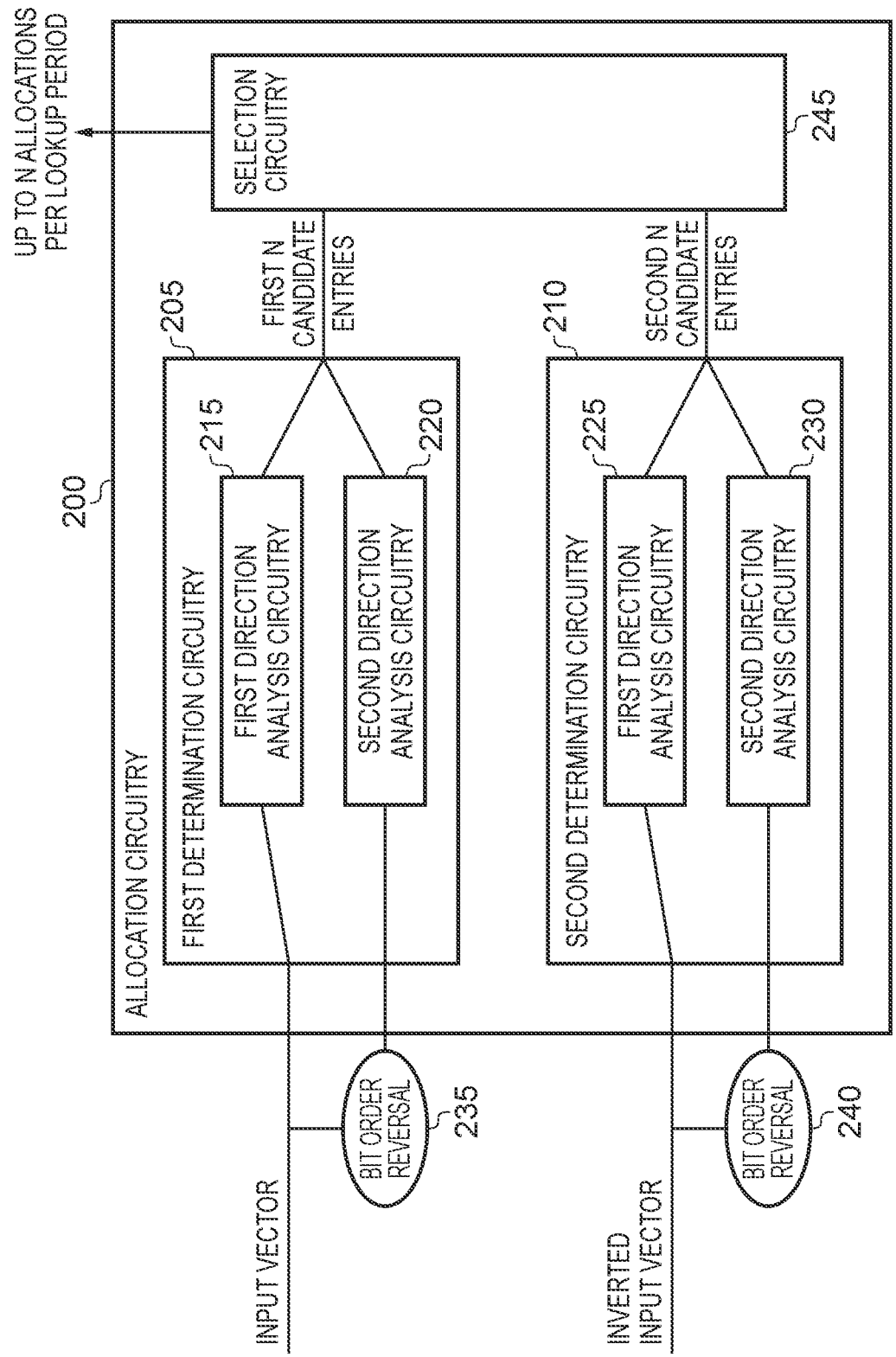
FIG. 3 schematically illustrates the allocation circuitry in accordance with one example implementation.

FIG. 3 is a block diagram schematically illustrating the allocation circuitry in one example implementation. In this implementation, the allocation circuitry 200 is considered as being formed of first determination circuitry 205 and second determination circuitry 210. The first determination circuitry receives the input vector and a bit order reversed version of the input vector generated by the bit order reversal function 235. The second determination circuitry 210 receives the inverted input vector and a bit order reversed version of the inverted input vector generated by the bit order reversal function 240. It will be appreciated that the bit order reversal can in one example implementation just be achieved by appropriate wiring and hence does not require any additional circuit components to implement the functionality of the blocks 235 and 240.

As shown in FIG. 3, the first determination circuitry 205 is formed of first direction analysis circuitry 215 and second direction analysis circuitry 220, which in one example implementation are arranged to analyse the input vector from opposite ends, looking for logic zero values. In one example implementation, the use of the first and second direction analysis circuits 215, 220 results in the generation of a first N candidate entries. In particular, the first direction analysis circuitry can be arranged to detect the first N/2 entries having a logic zero value, starting from first end of the input vector, whilst the second direction analysis circuitry can be arranged to detect the first N/2 entries having a logic zero value, starting from the opposite (second) end of the input vector. In one particular example embodiment, by providing the second direction analysis circuitry 220 with a bit order reversed version of the input vector, the second direction analysis circuitry 220 can be constructed in an identical manner to the first direction analysis circuitry 215.

In parallel with the above described operation of the first determination circuitry, the second determination circuitry 210 can also be arranged to analyse the inverted input vector. As with the first determination circuitry 205, the second determination circuitry 210 has first direction analysis circuitry 225 and second direction analysis circuitry 230, which are arranged to analyse the inverted input vector starting from opposite ends to each other, each producing N/2 candidate entries. Logically, the first direction analysis circuitry 225 is arranged to determine N/2 logic one values starting from the first end of the input vector, whilst the second direction analysis circuitry 230 is arranged to determine N/2 logic one values starting from the second end of the input vector. However, by providing the second determination circuitry 210 with the inverted input vector, the first and second direction analysis circuits 225, 230 can be arranged to detect logic zero values in the inverted input vector instead of being arranged to detect logic one values in the input vector, hence enabling them to be constructed in an identical manner to the first and second direction analysis circuits 215, 220 used by the first determination circuitry 205.

Each of the instances of the first and second direction analysis circuits 215, 220, 225, 230 can be viewed as forming one of the earlier discussed groups of determination blocks, and by arranging the circuits as shown in FIG. 3 this provides a particularly efficient implementation, in particular allowing each of the direction analysis circuits 215, 220, 225, 230 to be constructed identically.

As shown in FIG. 3, once all of the candidate entries have been generated by the first determination circuitry 205 and second determination circuitry 210, then selection circuitry 245 can be used to select up to N allocated entries per lookup period, each allocated entry being chosen from one of the provided candidate entries. As discussed earlier, which candidate entries are selected will depend on the number of misses detected in the current cycle, and the number of zeros in the input vector as provided to the allocation circuitry.

Figure 4A:
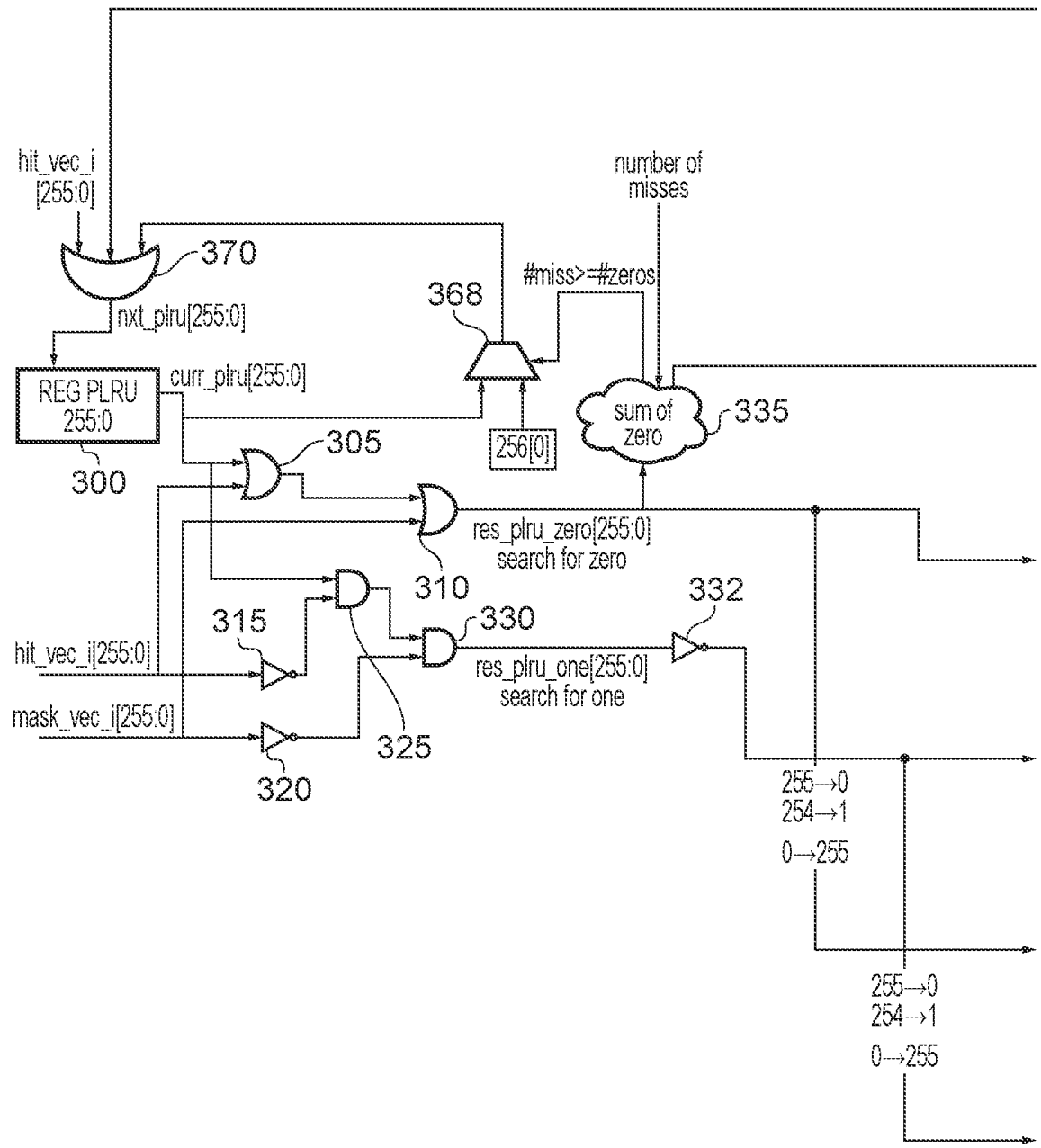
FIG. 4A illustrates one specific example implementation of the circuitry of FIG. 2, whilst
Figure 4A:
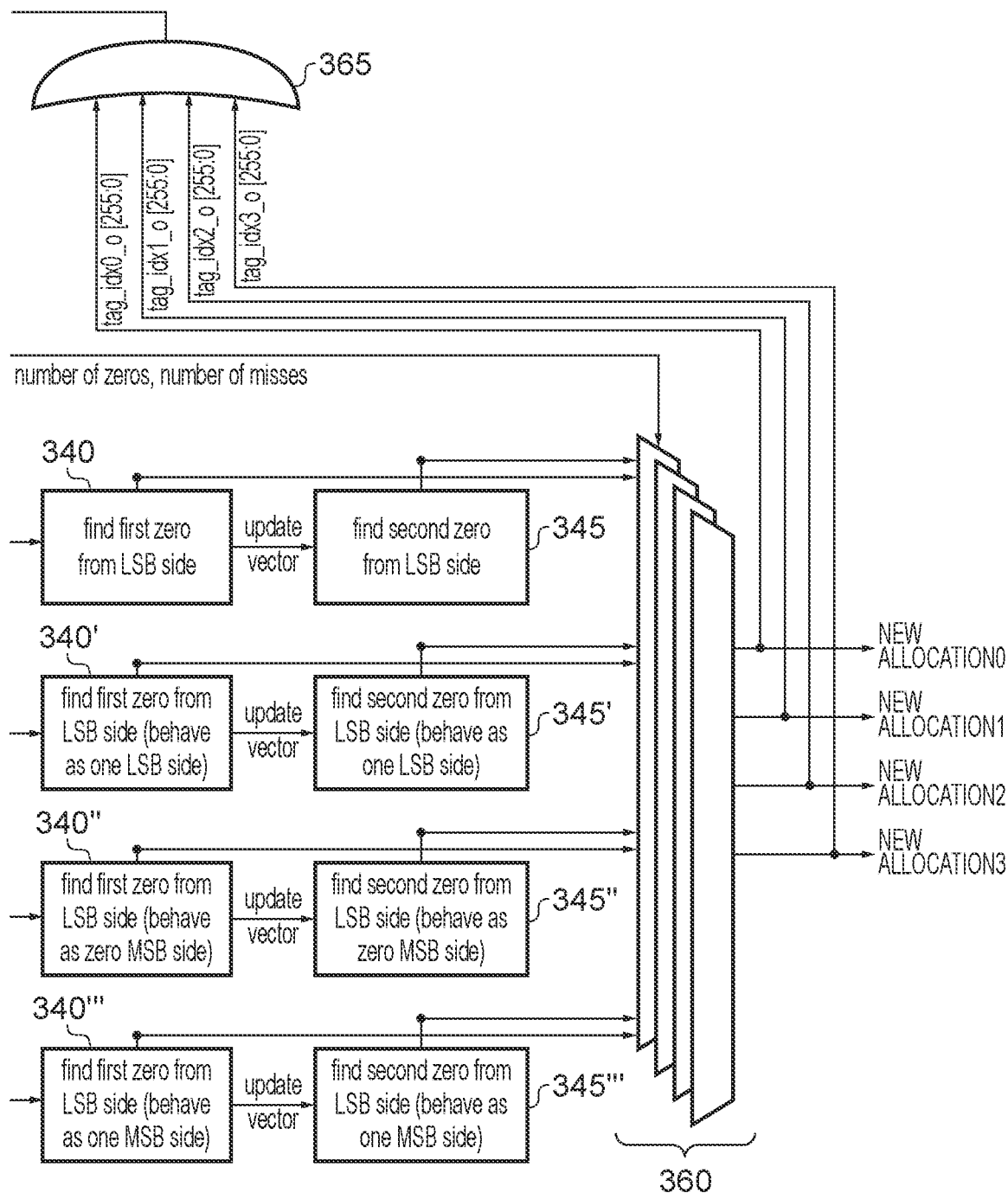
Figure 4B:
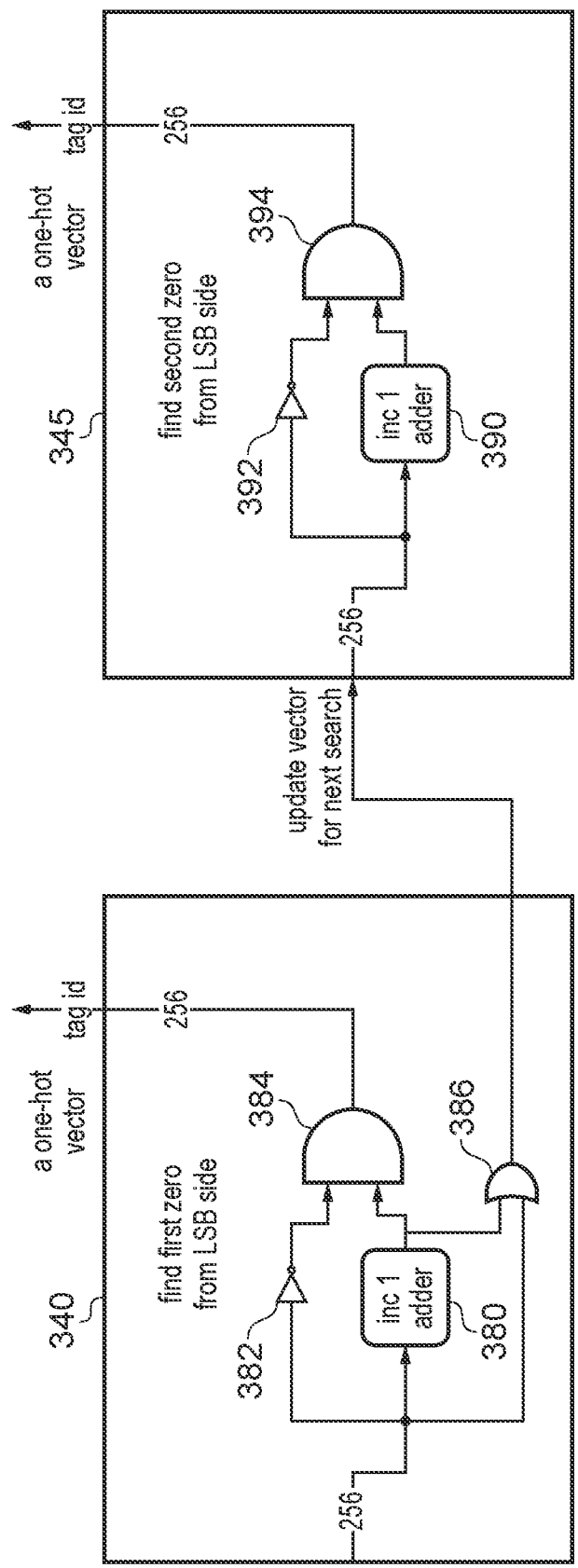
FIG. 4B illustrates components provided within each pair of determination blocks shown in FIG. 4A.

FIGS. 4A and 4B provide a particular example of the circuitry of FIG. 2, for an implementation where a PLRUm scheme is used. The storage component 300 forms the vector providing circuitry 100 of FIG. 2, and hence generates the earlier discussed input vector. The OR gates 305, 310 serve to selectively modify the input vector based on a provided hit vector (identifying any entries that have resulted in a hit indication in the current cycle) and mask vector (identifying any entries which should be excluded from being candidate entries for allocation). The inverters 315, 320 and AND gates 325, 330 serve the same function as the OR gates 305, 310, but for a signal path that will be used to generate an inverted version of the input vector via the inverter 332. Hence, it can be seen that the logic gates 305, 310, 315, 320, 325 and 330 collectively implement the input vector modification circuitry 105 discussed earlier with reference to FIG. 2.

In this example, four groups of determination blocks are used, each formed of two determination blocks. From a comparison of FIG. 4A with FIG. 3, it will be appreciated that the group of determination blocks 340, 345 form the first direction analysis circuitry 215, the group of determination blocks 340', 345' form the first direction analysis circuitry 225, the group of determination blocks 340", 345"

form the second direction analysis circuitry 220, and the group of determination blocks 340''', 345''' form the second direction analysis circuitry 230. As mentioned earlier, each group of determination blocks can be constructed identically, and in one example take the form shown in FIG. 4B. FIG. 4B is illustrated for the example of the group of blocks 340, 345, but applies identically to each of the other three groups of blocks shown.

The determination block 340 receives a source vector, and includes an adder circuit 380 to increment the input source vector by 1, with the AND gate 384 then performing a logical AND of the incremented version of the source vector produced by the adder 380 with an inverted version of the source vector produced by the inverter 382. This results in a one hot vector output identifying the position of the first logic zero value within the input source vector, starting from the left hand side of that source vector. In parallel with the operation of the AND gate 384, the OR gate 386 is arranged to logically combine the input source vector with the incremented version of the source vector to produce an updated vector to be provided to the next determination block 345.

Within the determination block 345, the adder 390, inverter 392 and AND gate 394 operate in an identical manner to the adder 380, inverter 382 and AND gate 384 within the determination block 340, resulting in the generation of a further one hot vector identifying the location of the second zero within the input source vector (due to the block 345 receiving the updated vector as its input), starting from the left-hand side.

As discussed earlier, each of the four groups of determination blocks receive a different source vector. Hence, whilst the group formed of the determination blocks 340, 345 finds the first and second logic zero values starting from the left-hand side (which may also be referred to herein as the least significant bit side) of the input vector, the group formed of the determination blocks 340', 345' receives the inverted input vector, and hence, whilst constructed identically to the group of determination blocks 340, 345, actually identifies the location of the first and second logic one values of the input vector, starting from the left-hand side. Similarly, the groups 340'', 345'' and 340''', 345''' receive bit order reversed versions of the input vector and of the inverted input vector, respectively, and hence logically find the first and second logic zero values and the first and second logic one values within the input vector, starting from the right-hand side (which may also be referred to herein as the most significant bit side).

The selection circuitry 245 of FIG. 3 is formed by the multiplexing components 360 shown in FIG. 4A, which are controlled in dependence on the number of misses detected in the current cycle, and number of zeros in the input vector (this information being generated by the sum of zero logic 335 shown in FIG. 4A). Based on this information, the multiplexer circuitry can be arranged to identify up to four allocated entries, namely one for each miss indication. In the illustrated example each allocated entry is indicated by an allocation vector having a bit for each entry, with a logic 1 value in that vector identifying the allocated entry, and all other values in that vector being logic 0 values. The generated allocation vectors can then be combined by OR gate circuitry 365 to produce a combined allocation vector routed to the OR gate 370, for use in generating the updated input vector to be stored in the storage element 300. The OR gate circuitry 370 will also receive the hit vector and the output from the multiplexor 368, which would typically just return the current input vector to the OR gate, but which can be arranged to generate an all zeros vector upon occurrence of a reset condition, namely when the number of misses exceeds the number of zeros in the currently used input vector.

In one particular example implementation, the output multiplexers 360 forming the selection circuitry are arranged to generate the four new allocation signals as follows:
  "New Allocation0" (2:1)
    If #of_zero==0 & #of_miss >=1:
      Output=find first one from LSB side
    If #of_zero >0 & #of_miss >=1:
      Output=find first zero from LSB side
  "New Allocation1" (3:1)
    if #of_zero >=2 & #of_miss >=2:
      Output=find first zero from MSB side
    if #of_zero==1 & #of_miss >=2:
      Output=find first one from LSB side
    if #of_zero==0 & #of_miss >=2:
      Output=find first one from MSB side
  "New Allocation2" (4:1)
    if #of_zero >=3 & #of_miss >=3:
      Output=find second zero from LSB side
    if #of_zero==2 & #of_miss >=3:
      Output=find first one from LSB side
    if #of_zero==1 & #of_miss >=3:
      Output=find first one from MSB side
    if #of_zero==0 & #of_miss >=3:
      Output=find second one from LSB side
  "New Allocation3" (5:1)
    if #of_zero >=4 & #of_miss >=4:
      Output=find second zero from MSB side
    if #of_zero==3 & #of_miss >=4:
      Output=find first one from LSB side
    if #of_zero==2 & #of_miss >=4:
      Output=find first one from MSB side
    if #of_zero==1 & #of_miss >=4:
      Output=find second one from LSB side
    if #of_zero==0 & #of_miss >=4:
      Output=find second one from MSB side The example implementation shown in FIGS. 4A and 4B is designed having regard to timing. In particular, it provides a particularly fast technique for determining up to four allocated entries, as the critical path from a timing point of view within the circuitry of FIG. 4A is that between the provision of the various derivatives of the input vector to the determination blocks, and the generation of the candidate entries from which the required number of allocated entries can be selected. In the design shown in FIG. 4A, this critical path only comprises two determination blocks, since each group of determination blocks operates in parallel and each only comprises two determination blocks. Such an implementation can hence be used in situations where the clock speed is relatively high, still allowing up to four allocated entries to be determined each clock cycle.

Figure 5A:
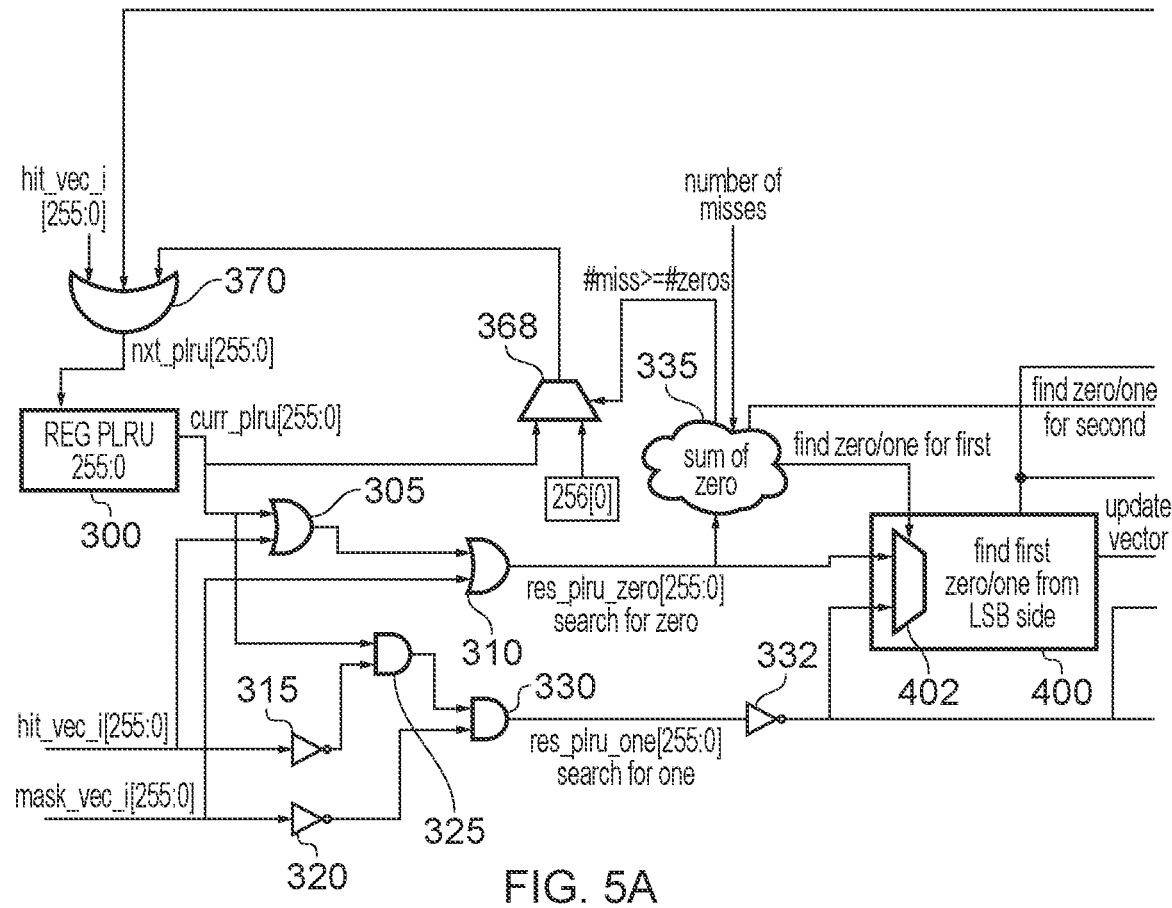
FIG. 5A illustrates another specific example implementation of the circuitry of FIG. 2, whilst
Figure 5B:
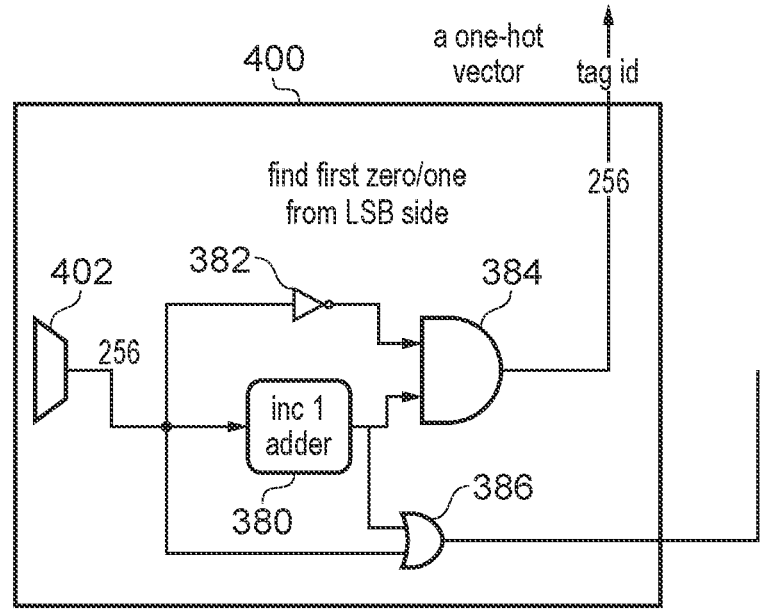
FIG. 5B illustrates components provided within the first two determination blocks shown in FIG. 5A.
Figure 5A:
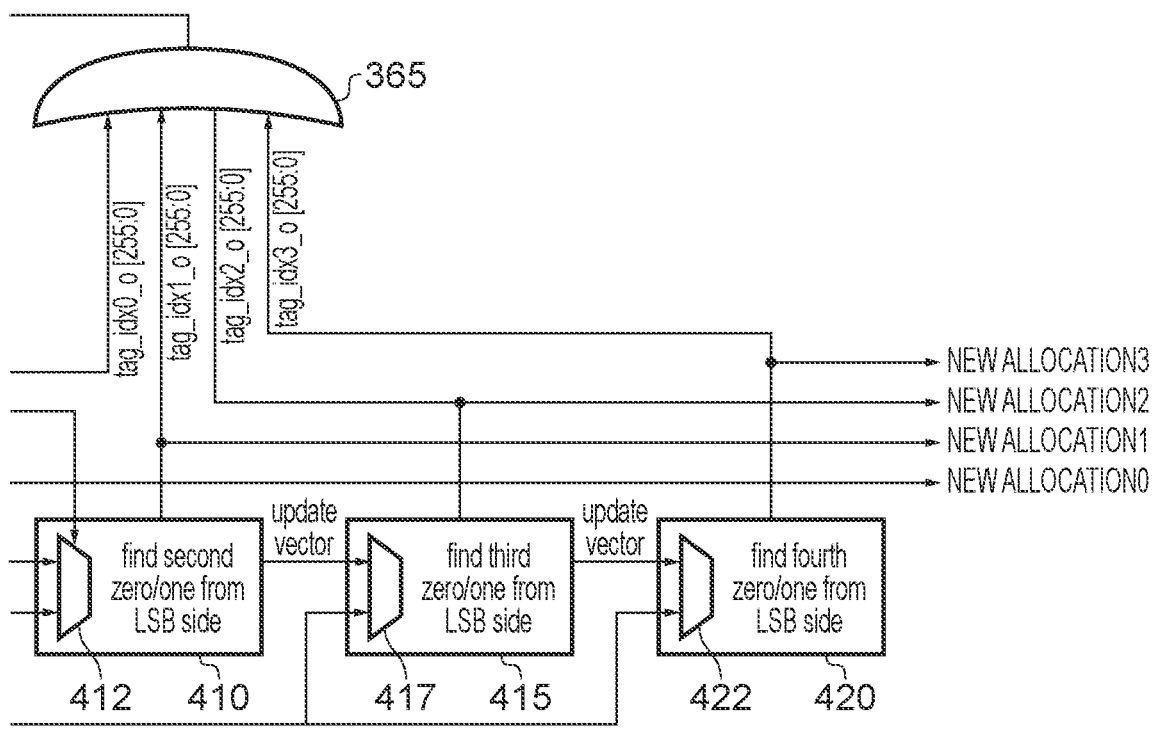
Figure 5B:
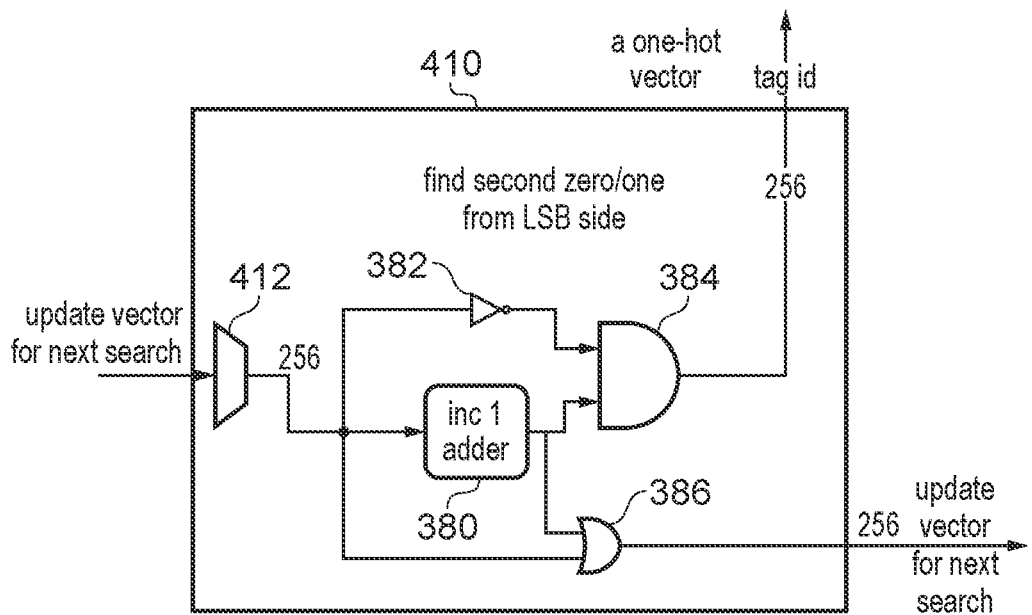

If instead the clock speed is somewhat slower, and/or if area is more of a concern than timing, then in an alternative example implementation the approach shown in FIGS. 5A and 5B could be used. As will be apparent from a comparison of FIG. 5A with FIG. 4A, the front end of the circuitry is unchanged, but instead of having four parallel groups of determination blocks, each comprising two determination blocks (such an implementation may hence be referred to as a chain of two implementation), there is instead a single group of determination blocks that comprises four determination blocks (such an implementation may hence be referred to as a chain of four implementation). The critical path discussed earlier hence now comprises four determination blocks rather than two, but the overall number of determination blocks required is four rather than eight, hence allowing a reduction in area.

As shown in FIG. 5A, each determination block has a multiplexer 402, 412, 417, 422 at its input, enabling that determination block to switch between two different inputs. In particular, dependent on the number of zeros within the input vector as output by the OR gate 310, it may be necessary to switch from the input vector to the inverted version of the input vector output by the inverter 332 at some point during the process of determining the candidate entries. For instance, by way of specific example, if there are at least four logic zero values within the input vector, then all of the candidate values can be computed based on the input vector, but if there are only two logic zero values within the input vector, then the first two candidate entries can be determined based on the input vector, whilst the final two candidate entries should be determined based on the inverted input vector. It should be noted that if it is necessary at some point (which we will call determination block X for the purposes of this discussion) to switch from the non-inverted version of the input vector to the inverted version of the input vector, that switch will only need to occur in relation to the determination block X, since each subsequent determination block, if any, after determination block X will use the updated vector generated by the preceding determination block, and hence will receive an updated vector that is derived from the inverted version of the input vector.

As can be seen from a comparison of FIG. 5B with FIG. 4B, the construction of each of the determination blocks is essentially the same as that described earlier with reference to FIG. 4B. In particular, each of the first three determination blocks 400, 410, 415 will be constructed in the same manner as the first determination block 340 shown in FIG. 4B, but with the earlier-mentioned multiplexer at the input to enable the input to be switched to the inverted version of the input vector if necessary. The final determination block 420 will then be constructed in the same way as the determination block 345 of FIG. 4B, again with the earlier-mentioned multiplexer at its input.

Whilst FIG. 4A shows a chain of two implementation and FIG. 5A shows a chain of four implementation, it will be appreciated that the techniques described therein can be extended to other arrangements. Merely by way of illustrative example, each of the groups of determination blocks shown in FIG. 4A could be extended to include three determination blocks (hence a chain of three implementation) whilst the corresponding FIG. 5A arrangement could then be extended to include six determination blocks rather than the four shown (hence a chain of six implementation).

Figure 6A:
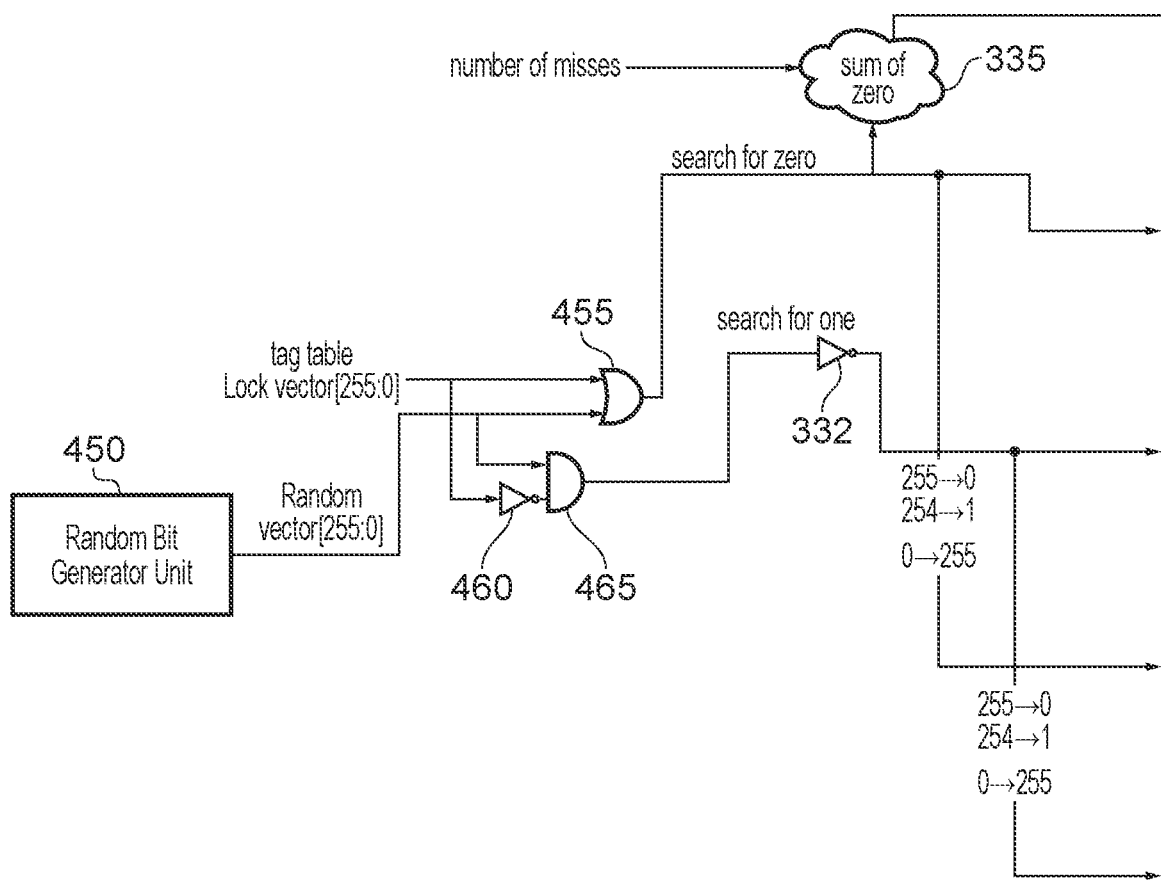
FIG. 6A illustrates another specific example implementation of the circuitry of FIG. 2, whilst
Figure 6B:
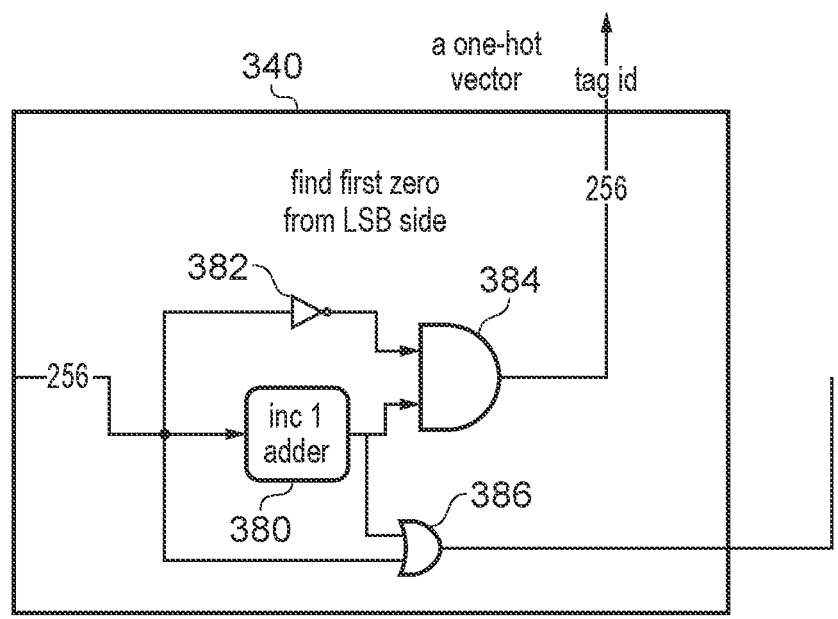
FIG. 6B illustrates components provided within each pair of determination blocks shown in FIG. 6A.
Figure 6A:
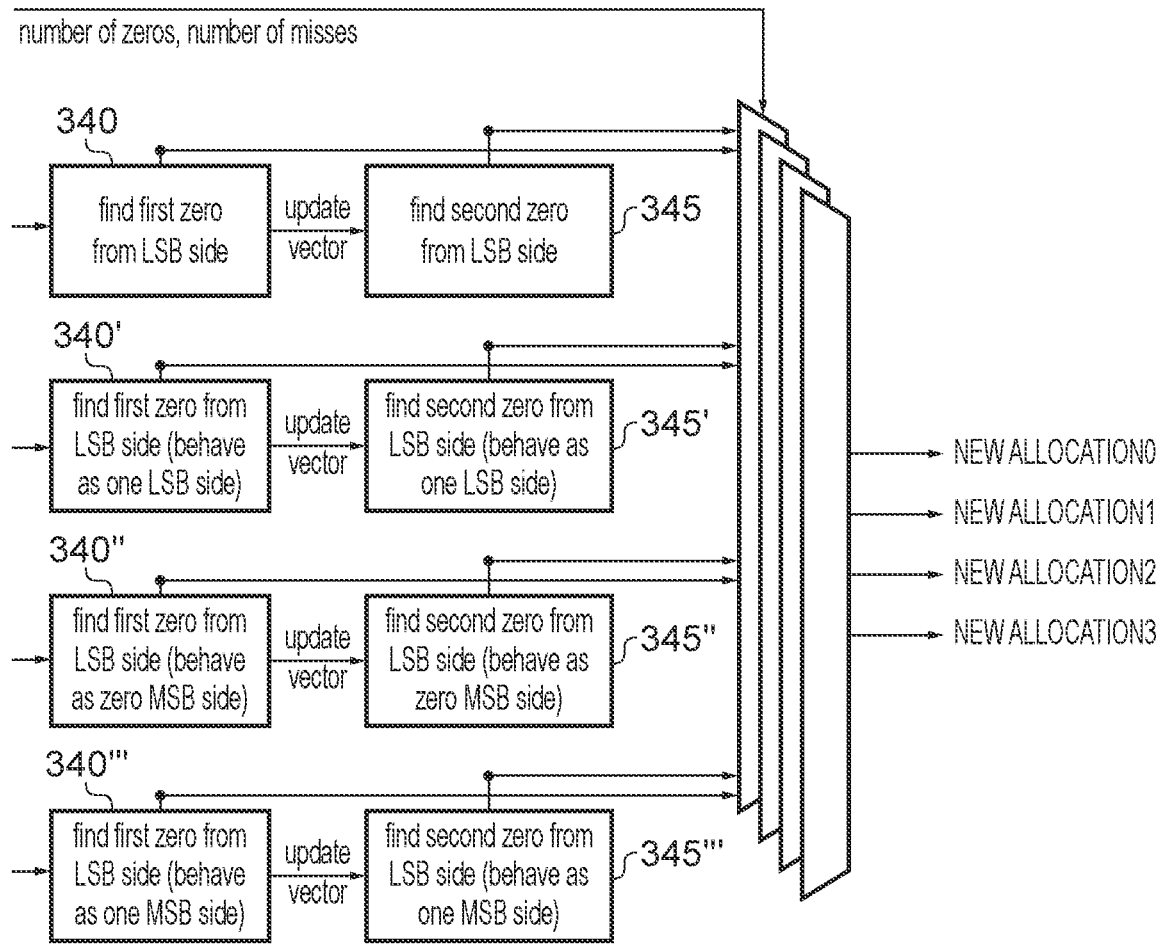
Figure 6B:
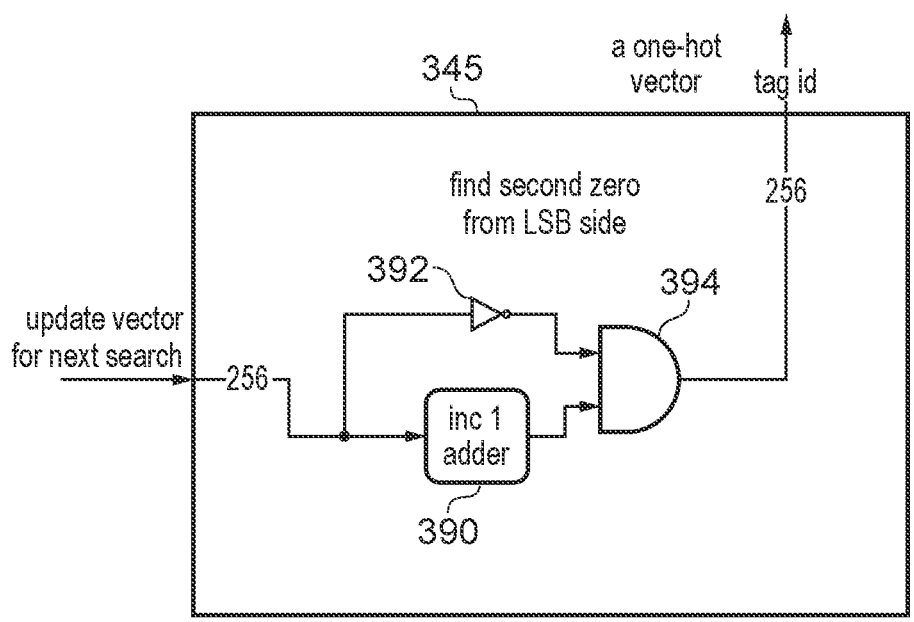

FIGS. 6A and 6B illustrate another example implementation, but where instead of a PLRUm based scheme, a random replacement scheme is used. Hence, in place of the PLRU register 300 used in FIG. 4A, a random bit generator 450 is used as the vector providing circuitry 100 illustrated earlier in FIG. 2. The tag table lock vector shown in FIG. 6A can be considered analogous to the mask vector described in FIG. 4A, and it will be appreciated that the OR gate 455, and the inverter 460 and AND gate 465 serve to implement the input vector modification circuitry 105 of FIG. 2. The downstream circuitry forming the remainder of the allocation circuitry is then the same as that discussed earlier with reference to FIG. 4A. However, there is no requirement for any components to update the random bit generator 450, since during each cycle the random bit generator 450 will generate an input vector where the value of 0 or 1 attributed to each bit in the input vector is determined in a random or pseudo random manner, and hence is not dependent on previous activity.

As with the example discussed earlier with reference to FIG. 4A, it will be seen that such an implementation provides a design that can operate at high clock speeds, whilst enabling the required number of allocated entries to be determined each clock cycle.

Figure 7A:
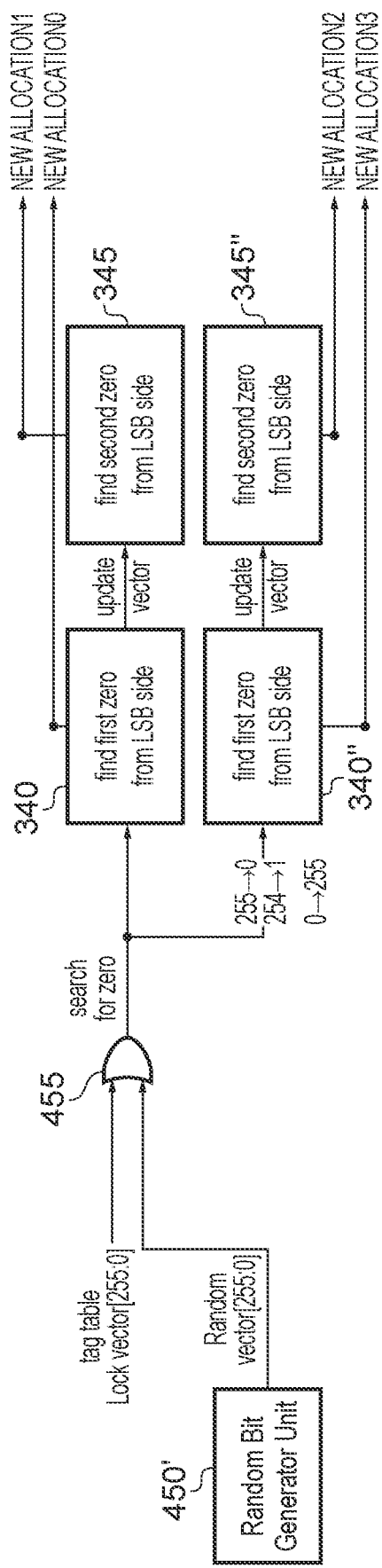
FIG. 7A illustrates another specific example implementation of the circuitry of FIG. 2, whilst
Figure 7B:
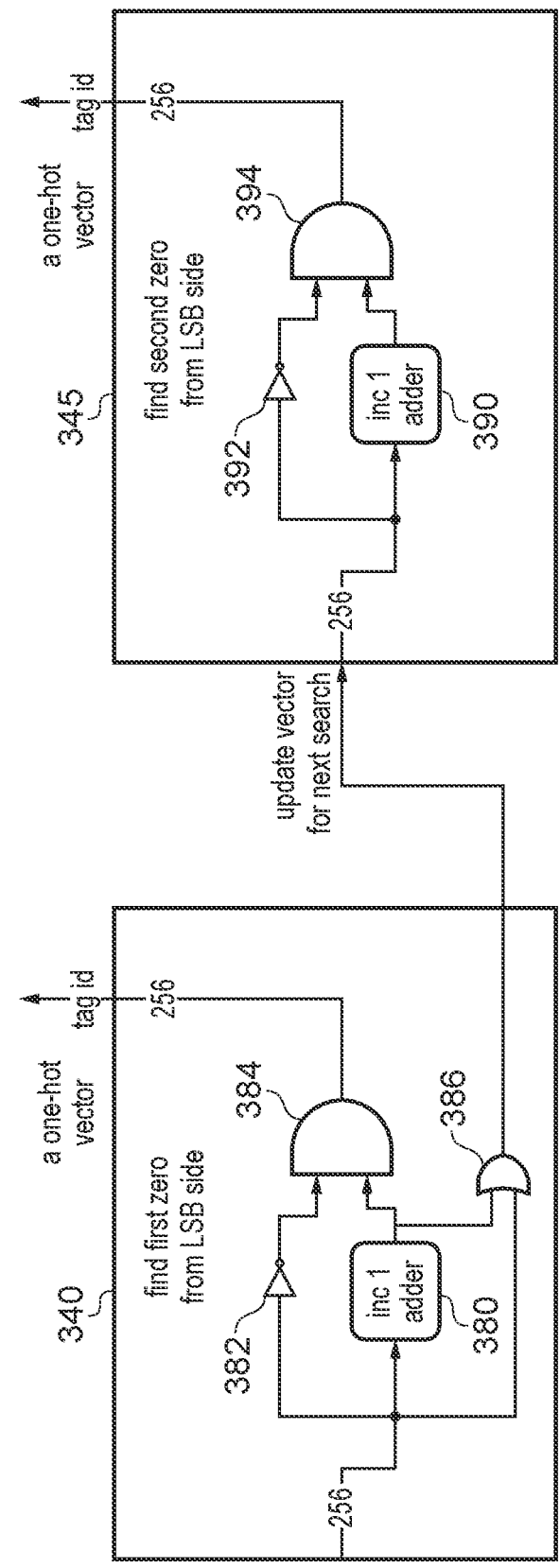
FIG. 7B illustrates components provided within each pair of determination blocks shown in FIG. 7A.

FIGS. 7A and 7B illustrate an alternative implementation that could be used when employing a random replacement scheme, if it can be ensured that the random bit generator unit will generate an input vector with at least a minimum number of logic 0 values in it that matches or exceeds the maximum number of misses that may be detected in a single clock cycle. Hence, as shown, the random bit generator unit 450' may generate an input vector meeting the above requirement, and in that case there will be no need to potentially use an inverted version of the input vector. As such, only the two groups of determination blocks shown (each formed of two determination blocks 340, 345 and 340", 345") are needed, one receiving the input vector as potentially modified by the OR gate 455, and the other receiving a bit order reversed version of that input vector.

Figure 8:
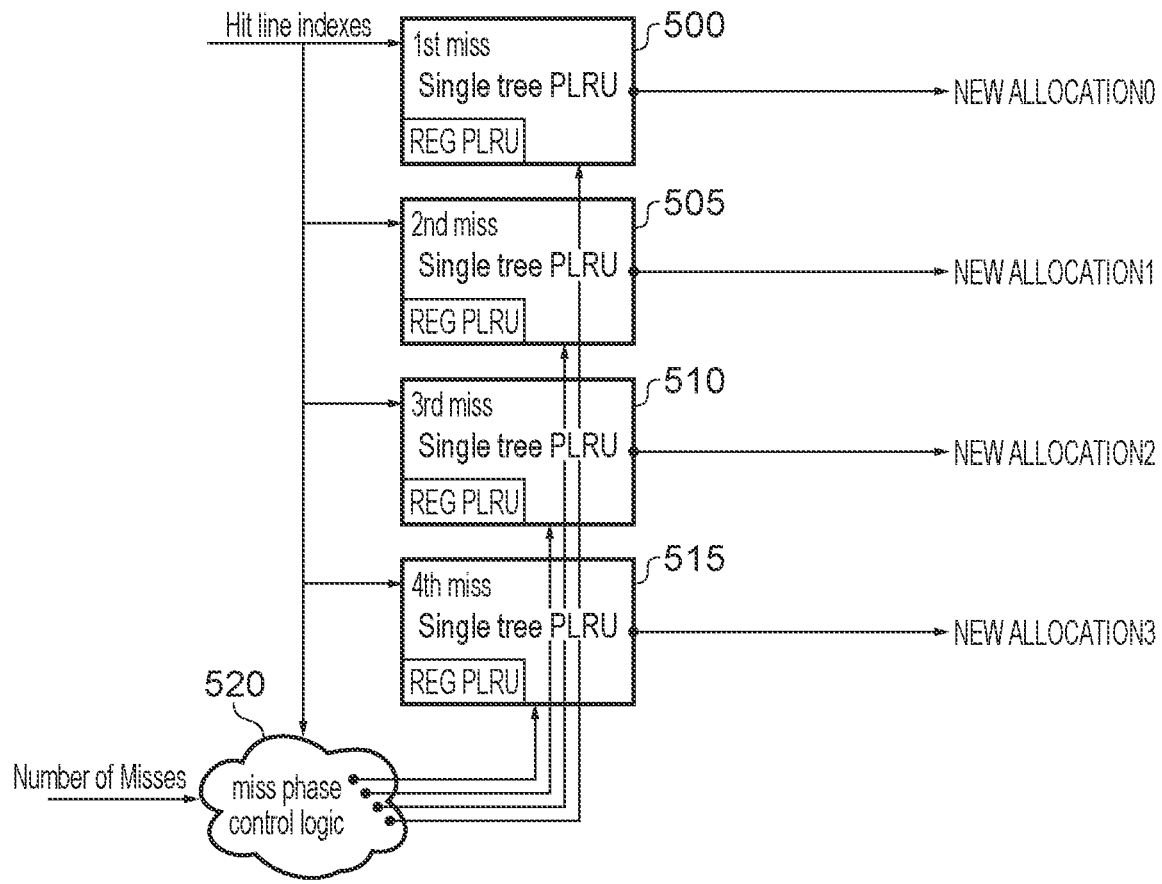
FIG. 8 schematically illustrates a tree PLRU (pseudo least recently used) scheme that may be employed by the allocation circuitry in accordance with another example implementation.

Whilst in the examples discussed with reference to FIGS. 2 to 7B, it is assumed that a vector providing circuit produces an input vector that is then processed in order to identify the required number of allocated entries, in an alternative implementation another replacement scheme could be used. For example, as shown in FIG. 8 the replacement scheme may be based on a tree PLRU scheme. As will be understood by those of ordinary skill in the art, a tree PLRU scheme can be arranged to maintain a tree that can be traversed when required to identify the next victim entry to be used as an allocated entry. As the tree is traversed, the pointers encountered within the tree are flipped such that after the victim entry has been identified a subsequent traversal of the tree would identify the next victim entry after the one just chosen. However, giving the timing constraints, there would be insufficient time to sequentially access such a tree multiple times during a single lookup period. Hence, in accordance with the technique described with reference to FIG. 8, multiple instances of the tree are maintained. In particular, considering an example where up to four misses may be detected within a single lookup period, and hence where up to four allocations may be required, four separate tree structures 500, 505, 510, 515 may be provided.

Each of the instances of the tree structure are updated based on the same hit indications generated during each lookup period, and in one example implementation the earlier-mentioned hit vector can be used as an input to each of the tree structures to cause those tree structures to be updated. However, in addition, miss phase control logic 520 is arranged to control a relative phasing between each of the tree structures, such that at any point in time each of them will identify a different allocated entry. In particular, each separate tree structure is associated with one of the N possible misses observable in any given lookup period, and then based on the number of misses detected in the lookup period, the miss phase control logic 520 can trigger one or more of the separate tree structures to each output an indication of an allocated entry.

Figure 9:
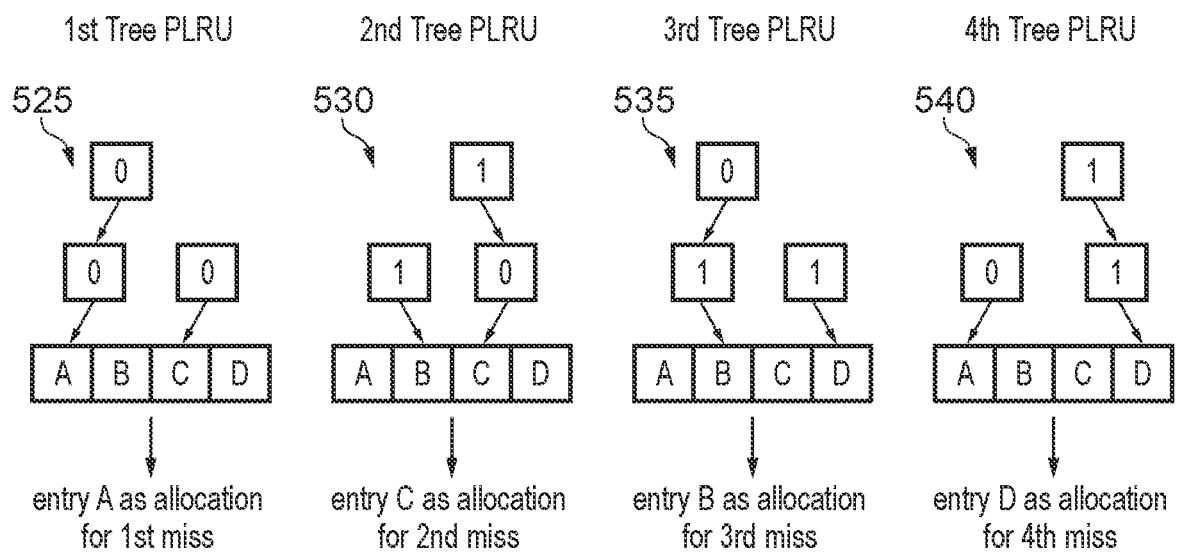
FIGS. 9 and 10 illustrate, by way of specific example, operation of the tree PLRU scheme shown in FIG. 8.

A graphical illustration as to how the relative phasing between the tree structures is maintained is schematically illustrated in FIG. 9. In this simple example, there are only two levels in the tree below the root node, but it will be appreciated that in a typical implementation the tree structures will be more complex. As shown in FIG. 9, it is assumed that the first tree 500 currently maintains the structure indicated by reference numeral 525. Each node stores a state value indicating whether a left path or a right path should be taken from that node (in this example a 0 indicating a left path and a 1 indicating a right path). In order to identify the entry to be allocated for a miss, the tree is traversed from the root node, following the direction indicated by the state values stored in the encountered nodes, and hence in this case will identify entry A as the allocated entry for a first miss. During the process of traversing the tree, the state value of each encountered node is flipped to identify the other path from that node, and hence after entry A is identified as the allocated entry for the first miss, the first tree will take the form indicated by the reference numeral 530.

However, due to the operation of the miss phase control logic 520, the second tree 505 will already be arranged to take that form, so as to point to the second allocated entry that should be chosen in the event that two misses occur within the single clock period. Hence, rather than needing to access the first tree 500 again, instead the second tree 505 can be accessed if desired in order to identify the second allocated entry, hence identifying entry C. After traversing the second tree in this manner, the updated tree would then take the form 535. Due to the earlier discussed phasing, this is the current initial state of the third tree 510, and hence that tree can be directly accessed if it is necessary to identify an allocated entry for a third miss during the single current clock cycle, which would cause entry B to be identified and the updated state of the third tree to be as indicated by reference numeral 540. In a similar way, it will be seen that the fourth tree 515 can be accessed if there is a need to identify a fourth allocated entry in the given clock cycle.

In any given lookup period, the miss phase control circuitry 520 will only activate the required number of tree structures to provide the necessary number of allocated entries taking into account the number of misses detected during that lookup period, and thereafter each of the tree structures will be updated based on the number of misses for which an allocated entry has been determined. Purely by way of example, if the maximum number of misses that may be detected in a lookup period is four, and in a given lookup period two misses are detected, the first tree structure 500 will be triggered to identify the allocated entry for the first miss, and the second tree structure 505 will be triggered to identify the allocated entry for the second miss, but the third and fourth tree structures 510, 515 will not be triggered since no further allocated entries need to be identified. However, at the end of this process, all four of the tree structures will be updated to take account of the fact that two allocated entries have been identified, hence moving all four trees two phases forward overall, so as to keep each tree structure one phase ahead of the preceding tree structure in the group of tree structures.

Figure 10:
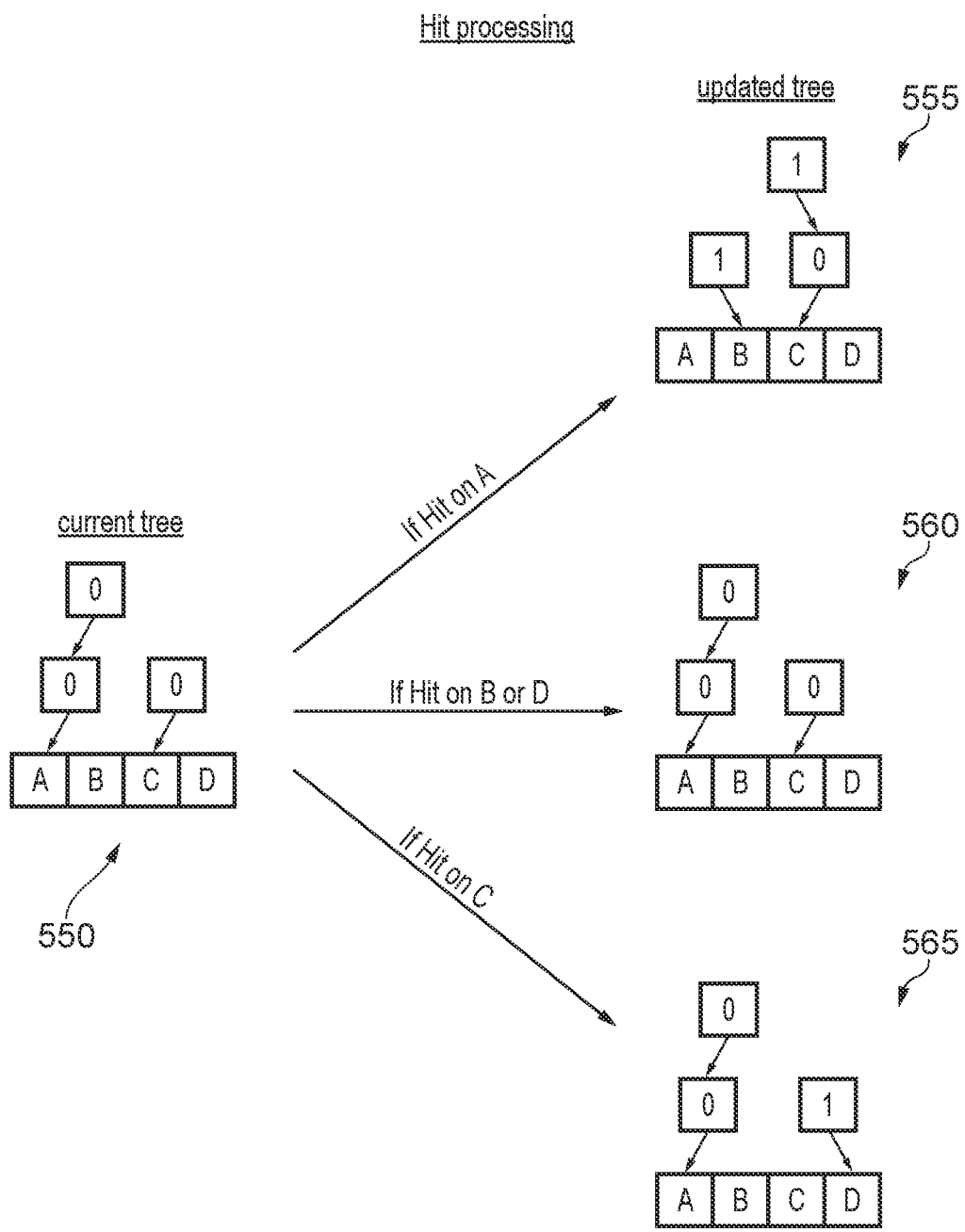

FIG. 10 schematically illustrates how any given tree structure may be updated dependent on an indication of a hit entry. If the state of the tree currently points to the hit entry in question, the tree is traversed in the opposite direction to that discussed with reference to FIG. 9 when identifying candidate entries following a miss, and as the tree is traversed the state value indicating the direction to follow is flipped. This process is continued up the tree until the point is reached where the current node under consideration is no longer being pointed to. Hence, as shown in FIG. 10, if there is a hit on entry A, and the current tree state 550 is pointing to entry A (thus indicating the entry A would be the next entry selected for eviction/allocation), then the tree is traversed flipping the state of all the nodes along the way to the root node, resulting in the updated tree state 555. As a result, it will be apparent that entry A is no longer identified as the entry to be evicted, and indeed now the entry that would be selected for eviction if required is entry C.

If instead there is a hit on entry B, then it is apparent that the current tree state 550 does not point to entry B, and hence no update to the table is required, as indicated by the tree state 560 in FIG. 10. As another example, if the hit entry was entry C, then it will be appreciated that there is one node pointing to entry C within the current tree state 550, and accordingly the tree state will be updated to the state 565 as shown in FIG. 10.

Each of the four tree structures 500, 505, 510, 515 can be updated in the manner illustrated in FIG. 10, using the same hit vectors generated in each lookup period, but as mentioned earlier relative phasing between those tree structures as controlled by the miss phase control logic 520 will ensure that at any point in time those four tree structures can be accessed in parallel to identify the first miss, second miss, third miss and fourth miss, respectively, if required. Hence, it will be appreciated that the approach shown in FIG. 8 provides another mechanism for providing allocation circuitry that can identify up to four allocated entries in a single clock period, but with this mechanism employing a tree PLRU scheme rather than the schemes discussed earlier with reference to FIGS. 2 to 7B. It will also be appreciated that the technique described in FIG. 8 can be extended as required to identify more than four allocations per clock cycle if desired, by replicating the tree PLRU structure the required number of times.

Figure 11:
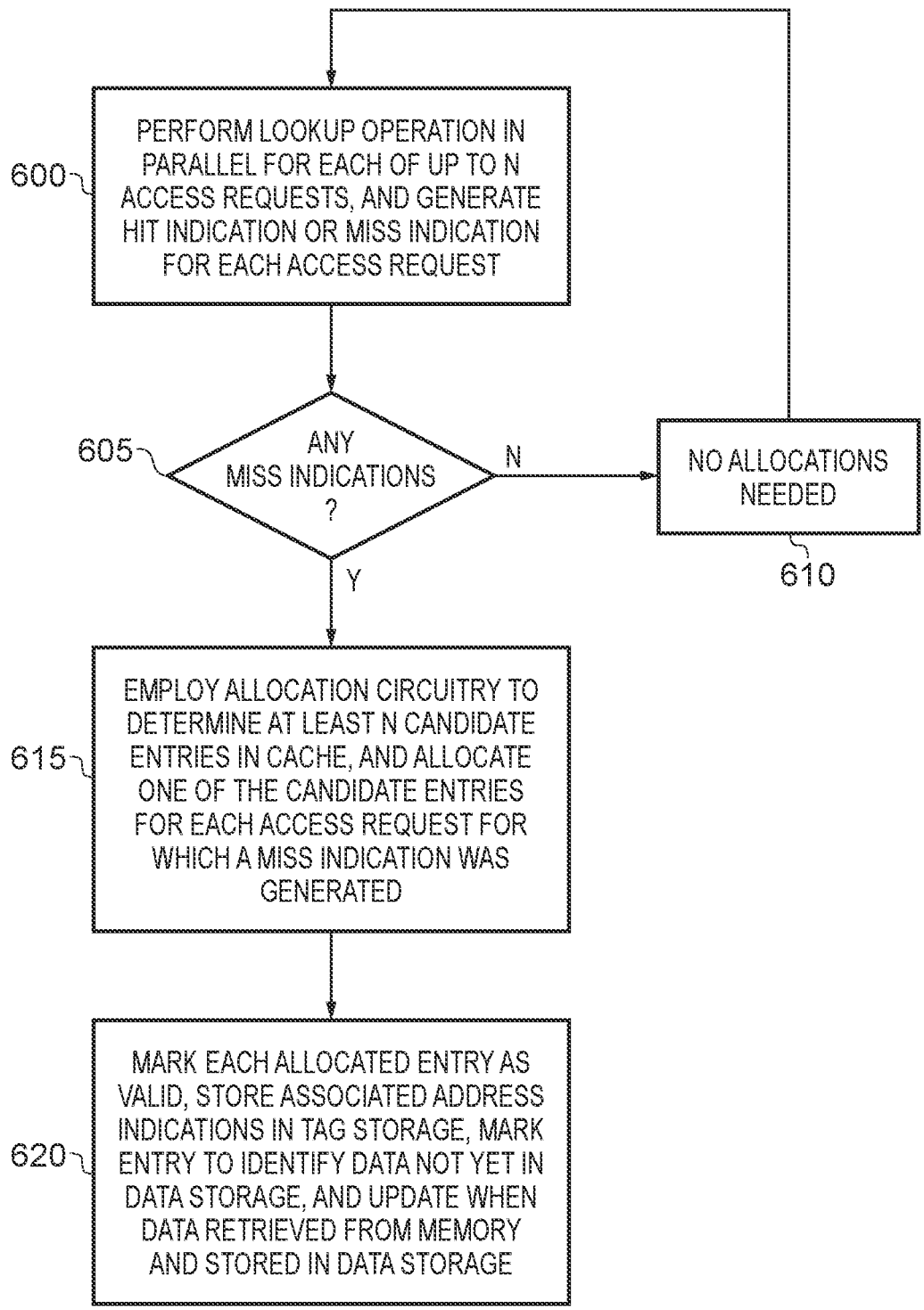
FIG. 11 is a flow diagram illustrating the steps performed in each lookup period to process a plurality of access requests, in accordance with one example implementation.

FIG. 11 is a flow diagram identifying the process performed when employing the techniques described herein. At step 600, upon receipt of a number of access requests, lookup operations are performed in parallel for each of the access requests received (this process can be performed for up to N access requests in parallel), and a hit indication or miss indication is generated for each of those access requests. At step 605, it is then determined whether any miss indications were generated, and if not it is determined at step 610 that no entries need to be allocated. Accordingly, each of the hit indications can be processed in the normal manner, to return the required data to the requesting processing circuitry, and the process can return to step 600.

However, if there is at least one miss indication generated, then the process proceeds from step 605 to 610, where the allocation circuitry 45 is used to determine at least N candidate entries in the cache using any of the earlier described techniques, and one of the determined candidate entries is allocated for each access request for which a miss indication was generated. Thereafter, at step 620, the existing contents of those allocated entries are overwritten (optionally after evicting those contents to a lower level of cache or main memory dependent on implementation), and then each allocated entry is marked as valid, with the associated address indication being stored in the relevant tag entry of the tag storage. Further, that entry is marked to identify that the data is not yet in the corresponding entry of the data storage, and that information is then updated when the data has been retrieved from memory and stored in the data storage, as discussed earlier. As mentioned earlier, following allocation of a particular entry, then in the next lookup period a hit can be detected in respect of that entry even if the data is not yet in the cache, with the data being forwarded on in due course when available.

Concepts described herein may be embodied in computer-readable code for fabrication of an apparatus that embodies the described concepts. For example, the computer-readable code can be used at one or more stages of a design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

From the above described example implementations, it will be appreciated that the techniques described herein enable a cache to be provided that can cope with the high data throughput demands of certain processing elements that may utilise that cache. In particular, not only can the described techniques enable up to N access requests to be processed in parallel during a single lookup period (for example a single clock cycle), but also for allocated entries to be identified for each of the up to N miss indications that may be detected as a result of processing those up to N access requests. This enables the cache to operate in a non-blocking manner, processing up to N access requests in each lookup period.

Other example arrangements are set out in the following clauses:

1. An apparatus comprising:
   a cache storage comprising a plurality of entries to store data;
   lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request;
   wherein the lookup circuitry is configured to perform, during a single lookup period, lookup operations in parallel for up to N access requests, where N is a plural integer; and
   the apparatus further comprises:
   allocation circuitry configured to determine, during the single lookup period, at least N candidate entries for allocation from amongst the plurality of entries, and to cause one of the candidate entries to be allocated for each of the up to N access requests for which the lookup circuitry generates the miss indication.

2. An apparatus as in Clause 1, further comprising:
   vector providing circuitry to provide an input vector specifying a qualifying value for each of the plurality of entries; and
   the allocation circuitry is arranged to determine the at least N candidate entries in dependence on the input vector.

3. An apparatus as in Clause 2, further comprising input vector modification circuitry to selectively modify the input vector prior to provision to the allocation circuitry, to take account of at least one modification condition.

4. An apparatus as in Clause 2 or Clause 3, wherein each qualifying value is set to one of a first value and a second value and, at least when a number K of qualifying values having the first value in the input vector as provided to the allocation circuitry is at least equal to a number P of miss indications generated by the lookup circuitry in the lookup period, where P is less than or equal to N, the allocation circuitry is inhibited from selecting as one of the at least N candidate entries any entry whose associated qualifying value has the second value.

5. An apparatus as in Clause 4, wherein:
   the vector providing circuitry comprises pseudo least recently used (PLRU) vector providing circuitry to maintain, as the input vector, a PLRU vector specifying, as the qualifying value for each of the plurality of entries, a usage indication value for each of the plurality of entries;
   the usage indication value is set to the second value when the associated entry is allocated and when a hit indication is detected for the associated entry, and is reset to the first value upon detection of a reset condition.

6. An apparatus as in Clause 4 or Clause 5, wherein:
   when the number K of qualifying values having the first value in the input vector as provided to the allocation circuitry is less than the number P of miss indications generated by the lookup circuitry in the lookup period, the allocation circuitry is arranged to determine at least K candidate entries whose associated qualifying values have the first value, for allocation for K access requests for which the lookup circuitry has generated the miss indication, and to determine at least P-K candidate entries whose associated qualifying values have the second value, for allocation for P-K access requests for which the lookup circuitry has generated the miss indication.

7. An apparatus as in Clause 6, wherein:
   the allocation circuitry is provided with the input vector and an inverted version of the input vector; and
   the allocation circuitry is arranged to determine the P-K candidate entries whose associated qualifying values have the second value by determining P-K candidate entries whose associated qualifying values have the first value in the inverted version of the input vector.

8. An apparatus as in Clause 6 or Clause 7, wherein:
   the allocation circuitry comprises first determination circuitry to determine a first N candidate entries whose associated qualifying values have the first value and second determination circuitry to determine a second N candidate entries whose associated qualifying values have the second value;
   when the number K of qualifying values having the first value in the input vector as provided to the allocation circuitry is at least equal to the number P of miss indications generated by the lookup circuitry in the lookup period, the allocation circuitry is arranged to cause the candidate entries allocated for each access request for which the lookup circuitry has generated the miss indication to be selected from the first N candidate entries; and
   when the number of qualifying values K having the first value in the input vector as provided to the allocation circuitry is less than the number of miss indications P generated by the lookup circuitry in the lookup period, the allocation circuitry is arranged to cause the candidate entries allocated for K access requests for which the lookup circuitry has generated the miss indication to be selected from the first N candidate entries, and to cause the candidate entries allocated for P-K access requests for which the lookup circuitry has generated the miss indication to be selected from the second N candidate entries.

9. An apparatus as in Clause 8, wherein:
   the allocation circuitry is provided with the input vector and an inverted version of the input vector; and
   the second determination circuitry is constructed identically to the first determination circuitry, the first determination circuitry is provided with the input vector, the second determination circuitry is provided with the inverted version of the input vector, and the second determination circuitry is arranged to determine the second N candidate entries whose associated qualifying values have the second value by determining a second N candidate entries whose associated qualifying values have the first value in the inverted version of the input vector.

10. An apparatus as in any of clauses 2 to 9, wherein:
    the allocation circuitry comprises first direction analysis circuitry and second direction analysis circuitry operating in parallel, the first direction analysis circuitry configured to analyse the input vector as provided to the allocation circuitry, starting from a first end, in order to identify at least N/2 candidate entries, and the second direction analysis circuitry configured to analyse the input vector as provided to the allocation circuitry, starting from a second end, in order to identify at least N/2 candidate entries.

11. An apparatus as in Clause 10, wherein:
    each qualifying value is a single bit;
    the allocation circuitry is provided with the input vector and a bit order reversed version of the input vector; and
    the second direction analysis circuitry is constructed identically to the first direction analysis circuitry, the first direction analysis circuitry is provided with the input vector, the second direction analysis circuitry is provided with the bit order reversed version of the input vector, and the second direction analysis circuitry is arranged to identify the at least N/2 candidate entries starting from the second end of the input vector by identifying at least N/2 candidate entries starting from the first end of the bit order reversed version of the input vector.

12. An apparatus as in Clause 10 or Clause 11, when dependent on Clause 8, wherein both the first determination circuitry and the second determination circuitry comprise the first direction analysis circuitry and the second direction analysis circuitry operating in parallel.

13. An apparatus as in any preceding clause, wherein:
    the allocation circuitry comprises a plurality of determination blocks forming at least one group of determination blocks, where each group comprises multiple determination blocks arranged in series;
    a first determination block in each group is arranged to receive a source vector derived from the input vector, and each other determination block in any given group is arranged to receive as a source vector an updated vector generated by a preceding determination block in that given group.

14. An apparatus as in Clause 13, wherein each determination block comprises combining circuitry to logically combine an incremented version of its source vector and an inverted version of its source vector to generate a one hot vector indicating a candidate entry.

15. An apparatus as in Clause 13 or Clause 14, wherein each determination block used to generate the updated vector is arranged to generate the updated vector by performing a logical OR computation using its source vector and an incremented version of its source vector.

16. An apparatus as in any of clauses 13 to 15, when dependent on clause 12, wherein:
    each instance of the first direction analysis circuitry and the second direction analysis circuitry is formed by a group of determination blocks;
    a first determination block in the first direction analysis circuitry of the first determination circuitry is arranged to receive as its source vector the input vector;
    a first determination block in the second direction analysis circuitry of the first determination circuitry is arranged to receive as its source vector a bit order reversed version of the input vector;
    a first determination block in the first direction analysis circuitry of the second determination circuitry is arranged to receive as its source vector an inverted version of the input vector; and a first determination block in the second direction analysis circuitry of the second determination circuitry is arranged to receive as its source vector a bit order reversed version of the inverted version of the input vector.

17. An apparatus as in Clause 16, wherein each group of determination block comprises two determination blocks.

18. An apparatus as in Clause 1, wherein:
the allocation circuitry is arranged to employ a tree pseudo least recently used (tree-PLRU) scheme to determine N candidate entries;
the lookup circuitry is arranged to generate, during each lookup period, a result signal indicating each entry for which a hit indication has been generated in that lookup period;
the allocation circuitry is arranged to maintain N separate tree structures, and to update each tree structure based on each result signal generated by the lookup circuitry; and
each separate tree structure is associated with one of N possible misses observable in any given lookup period, and the allocation circuitry comprises control circuitry to control each separate tree structure such that, when triggered by the control logic, that separate tree structure is arranged to identify the candidate entry for the associated miss, wherein the control logic is further arranged, in a given lookup period, to cause each of the separate tree structures to be updated in dependence on a number of misses observed in that given lookup period.

19. An apparatus as in any preceding clause, wherein the lookup period comprises one clock cycle.

20. An apparatus as in any preceding clause, wherein the cache storage is a fully associative cache storage.

21. An apparatus as in any preceding clause, wherein N is 4.

22. An apparatus as in any preceding clause, wherein the lookup circuitry comprises multiple instances of comparison circuitry operating in parallel to allow the memory addresses specified by each of the up to N access requests to be compared against an address indication for each entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a cache storage comprising a plurality of entries to store data;
lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request;
wherein the lookup circuitry is configured to perform, during a single lookup period, lookup operations in parallel for up to N access requests, where N is a plural integer; and
the apparatus further comprises:
allocation circuitry configured to determine, during the single lookup period, at least N candidate entries for allocation from amongst the plurality of entries, and to cause one of the candidate entries to be allocated for each of the up to N access requests for which the lookup circuitry generates the miss indication;
vector providing circuitry to provide an input vector specifying a qualifying value for each of the plurality of entries; and
the allocation circuitry is arranged to determine the at least N candidate entries in dependence on the input vector.

2. An apparatus as claimed in claim 1, further comprising input vector modification circuitry to selectively modify the input vector prior to provision to the allocation circuitry, to take account of at least one modification condition.

3. An apparatus as claimed in claim 1, wherein each qualifying value is set to one of a first value and a second value and, at least when a number K of qualifying values having the first value in the input vector as provided to the allocation circuitry is at least equal to a number P of miss indications generated by the lookup circuitry in the lookup period, where P is less than or equal to N, the allocation circuitry is inhibited from selecting as one of the at least N candidate entries any entry whose associated qualifying value has the second value.

4. An apparatus as claimed in claim 3, wherein:
the vector providing circuitry comprises pseudo least recently used (PLRU) vector providing circuitry to maintain, as the input vector, a PLRU vector specifying, as the qualifying value for each of the plurality of entries, a usage indication value for each of the plurality of entries;
the usage indication value is set to the second value when the associated entry is allocated and when a hit indication is detected for the associated entry, and is reset to the first value upon detection of a reset condition.

5. An apparatus as claimed in claim 3, wherein:
when the number K of qualifying values having the first value in the input vector as provided to the allocation circuitry is less than the number P of miss indications generated by the lookup circuitry in the lookup period, the allocation circuitry is arranged to determine at least K candidate entries whose associated qualifying values have the first value, for allocation for K access requests for which the lookup circuitry has generated the miss indication, and to determine at least P-K candidate entries whose associated qualifying values have the second value, for allocation for P-K access requests for which the lookup circuitry has generated the miss indication.

6. An apparatus as claimed in claim 5, wherein:
the allocation circuitry is provided with the input vector and an inverted version of the input vector; and
the allocation circuitry is arranged to determine the P-K candidate entries whose associated qualifying values have the second value by determining P-K candidate entries whose associated qualifying values have the first value in the inverted version of the input vector.

7. An apparatus as claimed in claim 5, wherein:
the allocation circuitry comprises first determination circuitry to determine a first N candidate entries whose associated qualifying values have the first value and second determination circuitry to determine a second N candidate entries whose associated qualifying values have the second value;
when the number K of qualifying values having the first value in the input vector as provided to the allocation circuitry is at least equal to the number P of miss indications generated by the lookup circuitry in the lookup period, the allocation circuitry is arranged to cause the candidate entries allocated for each access request for which the lookup circuitry has generated the miss indication to be selected from the first N candidate entries; and
when the number of qualifying values K having the first value in the input vector as provided to the allocation circuitry is less than the number of miss indications P generated by the lookup circuitry in the lookup period, the allocation circuitry is arranged to cause the candidate entries allocated for K access requests for which the lookup circuitry has generated the miss indication to be selected from the first N candidate entries, and to cause the candidate entries allocated for P-K access requests for which the lookup circuitry has generated the miss indication to be selected from the second N candidate entries.

8. An apparatus as claimed in claim 7, wherein:
the allocation circuitry is provided with the input vector and an inverted version of the input vector; and
the second determination circuitry is constructed identically to the first determination circuitry, the first determination circuitry is provided with the input vector, the second determination circuitry is provided with the inverted version of the input vector, and the second determination circuitry is arranged to determine the second N candidate entries whose associated qualifying values have the second value by determining a second N candidate entries whose associated qualifying values have the first value in the inverted version of the input vector.

9. An apparatus as claimed in claim 1, wherein:
the allocation circuitry comprises first direction analysis circuitry and second direction analysis circuitry operating in parallel, the first direction analysis circuitry configured to analyse the input vector as provided to the allocation circuitry, starting from a first end, in order to identify at least N/2 candidate entries, and the second direction analysis circuitry configured to analyse the input vector as provided to the allocation circuitry, starting from a second end, in order to identify at least N/2 candidate entries.

10. An apparatus as claimed in claim 9, wherein:
each qualifying value is a single bit;
the allocation circuitry is provided with the input vector and a bit order reversed version of the input vector; and
the second direction analysis circuitry is constructed identically to the first direction analysis circuitry, the first direction analysis circuitry is provided with the input vector, the second direction analysis circuitry is provided with the bit order reversed version of the input vector, and the second direction analysis circuitry is arranged to identify the at least N/2 candidate entries starting from the second end of the input vector by identifying at least N/2 candidate entries starting from the first end of the bit order reversed version of the input vector.

11. An apparatus as claimed in claim 7, wherein:
the allocation circuitry comprises first direction analysis circuitry and second direction analysis circuitry operating in parallel, the first direction analysis circuitry configured to analyse the input vector as provided to the allocation circuitry, starting from a first end, in order to identify at least N/2 candidate entries, and the second direction analysis circuitry configured to analyse the input vector as provided to the allocation circuitry, starting from a second end, in order to identify at least N/2 candidate entries; and
both the first determination circuitry and the second determination circuitry comprise the first direction analysis circuitry and the second direction analysis circuitry operating in parallel.

12. An apparatus as claimed in claim 1, wherein:
the allocation circuitry comprises a plurality of determination blocks forming at least one group of determination blocks, where each group comprises multiple determination blocks arranged in series;
a first determination block in each group is arranged to receive a source vector derived from the input vector, and each other determination block in any given group is arranged to receive as a source vector an updated vector generated by a preceding determination block in that given group.

13. An apparatus as claimed in claim 12, wherein each determination block comprises combining circuitry to logically combine an incremented version of its source vector and an inverted version of its source vector to generate a one hot vector indicating a candidate entry.

14. An apparatus as claimed in claim 12, wherein each determination block used to generate the updated vector is arranged to generate the updated vector by performing a logical OR computation using its source vector and an incremented version of its source vector.

15. An apparatus as claimed in claim 11, wherein:
the allocation circuitry comprises a plurality of determination blocks forming at least one group of determination blocks, where each group comprises multiple determination blocks arranged in series;
a first determination block in each group is arranged to receive a source vector derived from the input vector, and each other determination block in any given group is arranged to receive as a source vector an updated vector generated by a preceding determination block in that given group;
each instance of the first direction analysis circuitry and the second direction analysis circuitry is formed by a group of determination blocks;

a first determination block in the first direction analysis circuitry of the first determination circuitry is arranged to receive as its source vector the input vector;
a first determination block in the second direction analysis circuitry of the first determination circuitry is arranged to receive as its source vector a bit order reversed version of the input vector;
a first determination block in the first direction analysis circuitry of the second determination circuitry is arranged to receive as its source vector an inverted version of the input vector; and
a first determination block in the second direction analysis circuitry of the second determination circuitry is arranged to receive as its source vector a bit order reversed version of the inverted version of the input vector.

16. An apparatus comprising:
a cache storage comprising a plurality of entries to store data;
lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request;
wherein the lookup circuitry is configured to perform, during a single lookup period, lookup operations in parallel for up to N access requests, where N is a plural integer; and
the apparatus further comprises:
allocation circuitry configured to determine, during the single lookup period, at least N candidate entries for allocation from amongst the plurality of entries, and to cause one of the candidate entries to be allocated for each of the up to N access requests for which the lookup circuitry generates the miss indication;
wherein:
the allocation circuitry is arranged to employ a tree pseudo least recently used (tree-PLRU) scheme to determine N candidate entries;
the lookup circuitry is arranged to generate, during each lookup period, a result signal indicating each entry for which a hit indication has been generated in that lookup period;
the allocation circuitry is arranged to maintain N separate tree structures, and to update each tree structure based on each result signal generated by the lookup circuitry; and
each separate tree structure is associated with one of N possible misses observable in any given lookup period, and the allocation circuitry comprises control circuitry to control each separate tree structure such that, when triggered by the control logic, that separate tree structure is arranged to identify the candidate entry for the associated miss, wherein the control logic is further arranged, in a given lookup period, to cause each of the separate tree structures to be updated in dependence on a number of misses observed in that given lookup period.

17. An apparatus as claimed in claim 1, wherein the lookup period comprises one clock cycle.

18. A non-transitory computer-readable medium to store computer-readable code for fabrication of an apparatus comprising:
a cache storage comprising a plurality of entries to store data;
lookup circuitry, responsive to a given access request, to perform a lookup operation in the cache storage to determine whether one of the entries in the cache storage is allocated to store data associated with a memory address indicated by the given access request, to generate a hit indication for the given access request when one of the entries in the cache storage is allocated to store data associated with the memory address, and to otherwise generate a miss indication for the given access request;
wherein the lookup circuitry is configured to perform, during a single lookup period, lookup operations in parallel for up to N access requests, where N is a plural integer; and
the apparatus further comprises:
allocation circuitry configured to determine, during the single lookup period, at least N candidate entries for allocation from amongst the plurality of entries, and to cause one of the candidate entries to be allocated for each of the up to N access requests for which the lookup circuitry generates the miss indication;
vector providing circuitry to provide an input vector specifying a qualifying value for each of the plurality of entries; and
the allocation circuitry is arranged to determine the at least N candidate entries in dependence on the input vector.

* * * * *